US011477122B2

(12) United States Patent
Flajslik et al.

(10) Patent No.: US 11,477,122 B2
(45) Date of Patent: Oct. 18, 2022

(54) TECHNOLOGIES FOR SELECTING NON-MINIMAL PATHS AND THROTTLING PORT SPEEDS TO INCREASE THROUGHPUT IN A NETWORK

(71) Applicant: Intel Corporation, Santa Clara, CA (US)

(72) Inventors: Mario Flajslik, Hopkinton, MA (US); Eric R. Borch, Fort Collins, CO (US); Timo Schneider, Hudson, MA (US); Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 850 days.

(21) Appl. No.: 15/716,831

(22) Filed: Sep. 27, 2017

(65) Prior Publication Data

US 2019/0097935 A1 Mar. 28, 2019

(51) Int. Cl.
*H04L 47/22* (2022.01)
*H04L 43/0894* (2022.01)
(Continued)

(52) U.S. Cl.
CPC .......... *H04L 47/22* (2013.01); *H04L 41/0896* (2013.01); *H04L 43/0888* (2013.01);
(Continued)

(58) Field of Classification Search
None
See application file for complete search history.

(56) References Cited

U.S. PATENT DOCUMENTS 5,559,757 A * 9/1996 Catipovic .............. H04B 11/00
367/134
6,396,393 B2 * 5/2002 Yuasa .................. H04L 5/0044
375/260

(Continued)

OTHER PUBLICATIONS

Kim at al., Technology-Driven, Highly-Scalable Dragonfly Topology, International Symposium on Computer Architecture, Jun. 21-25, 2008, 12 pages.

*Primary Examiner* — Ayaz R Sheikh
*Assistant Examiner* — Faiyazkhan Ghafoerkhan
(74) *Attorney, Agent, or Firm* — Compass IP Law PC

(57) ABSTRACT

Technologies for improving throughput in a network include a node switch. The node switch is to obtain expected performance data indicative of an expected data transfer performance of the node switch. The node switch is also to obtain measured performance data indicative of a measured data transfer performance of the node switch, compare the measured performance data to the expected performance data to determine whether the measured data transfer performance satisfies the expected data transfer performance, determine, as a function of whether the measured data transfer performance satisfies the expected data transfer performance, whether to force a unit of data through a non-minimal path to a destination, and send, in response to a determination to force the unit of data to be sent through a non-minimal path, the unit of data to an output port of the node switch associated with the non-minimal path. Other embodiments are also described.

28 Claims, 11 Drawing Sheets

(51) Int. Cl.
  *H04L 41/0896* (2022.01)
  *H04L 43/0888* (2022.01)
  *H04L 45/12* (2022.01)
  *H04L 41/0893* (2022.01)
  *H04L 43/0882* (2022.01)
  *H04L 47/625* (2022.01)
(52) U.S. Cl.
  CPC ........ *H04L 43/0894* (2013.01); *H04L 45/123* (2013.01); *H04L 41/0893* (2013.01); *H04L 43/0882* (2013.01); *H04L 47/6255* (2013.01)

(56) References Cited

U.S. PATENT DOCUMENTS

| | | | | |
|---|---|---|---|---|
| 8,239,570 B2* | 8/2012 | Beeston | | H04L 45/24 709/238 |
| 9,900,253 B2* | 2/2018 | White | | G06F 9/5083 |
| 10,162,356 B2* | 12/2018 | Rao | | G08G 1/096827 |
| 10,462,040 B2* | 10/2019 | Fedyk | | H04L 45/22 |
| 2001/0008391 A1* | 7/2001 | Yuasa | | H04B 3/54 725/79 |
| 2007/0201371 A1* | 8/2007 | Chou | | H04L 45/28 370/237 |
| 2008/0186853 A1* | 8/2008 | Archer | | H04L 45/126 370/235 |
| 2008/0285458 A1* | 11/2008 | Lysne | | H04L 45/66 370/238 |
| 2010/0082840 A1* | 4/2010 | Beeston | | H04L 45/00 709/238 |
| 2012/0087377 A1* | 4/2012 | Lai | | H04L 45/04 370/427 |
| 2012/0089887 A1* | 4/2012 | Dhuse | | H03M 13/05 714/752 |
| 2013/0297947 A1* | 11/2013 | Resch | | H04L 41/06 707/697 |
| 2013/0325820 A1* | 12/2013 | Grube | | G06F 16/2365 707/691 |
| 2014/0010077 A1* | 1/2014 | Busch | | H04L 47/125 370/229 |
| 2014/0108882 A1* | 4/2014 | Grube | | H04L 45/24 714/755 |
| 2015/0110097 A1* | 4/2015 | Morrill | | H04L 67/146 370/338 |
| 2015/0155968 A1* | 6/2015 | Grube | | G06F 16/182 714/776 |
| 2015/0155969 A1* | 6/2015 | Volvovski | | G06F 16/182 714/776 |
| 2015/0332145 A1* | 11/2015 | Vasseur | | H04L 43/062 706/12 |
| 2016/0065477 A1* | 3/2016 | White | | H04L 47/125 370/237 |
| 2017/0149667 A1* | 5/2017 | Dahod | | H04L 67/148 |
| 2017/0222914 A1* | 8/2017 | Fedyk | | H04L 12/6418 |
| 2018/0131618 A1* | 5/2018 | White | | G06F 9/5083 |
| 2018/0174451 A1* | 6/2018 | Rao | | G01C 21/3461 |
| 2018/0191621 A1* | 7/2018 | Karthikeyan | | H04L 47/805 |
| 2018/0191635 A1* | 7/2018 | Karthikeyan | | H04L 45/302 |
| 2019/0007323 A1* | 1/2019 | White | | G06F 9/5083 |
| 2019/0068335 A1* | 2/2019 | Li | | H04W 72/0453 |
| 2019/0097935 A1* | 3/2019 | Flajslik | | H04L 43/0888 |
| 2020/0092208 A1* | 3/2020 | White | | H04L 43/0882 |
| 2021/0336885 A1* | 10/2021 | White | | H04L 47/125 |

* cited by examiner

TECHNOLOGIES FOR SELECTING NON-MINIMAL PATHS AND THROTTLING PORT SPEEDS TO INCREASE THROUGHPUT IN A NETWORK

STATEMENT REGARDING FEDERALLY SPONSORED RESEARCH

This invention was made with Government support under contract number H98230A-13-D-0124 awarded by the Department of Defense. The Government has certain rights in this invention.

BACKGROUND

In some high performance network topologies, referred to herein as fabrics, network fairness is an important factor in maintaining a target performance for many classes of applications. Network fairness can be defined as allocating network resources (e.g., bandwidth) among many nodes (e.g., compute devices that produce and/or consume data sent through the network), so that the resources are not disproportionately allocated to one node to the detriment of one or more other nodes in the network. Applications that are particularly sensitive to fairness include those that use global synchronization or local synchronization (e.g., waiting for all messages in a neighbor exchange). In such applications, performance is determined by the slowest node in the group, thus emphasizing fairness.

Hierarchical networks, by design, share links among many flows to reach high utilization. As a result, they are prone to network unfairness for many traffic patterns. Unfairness can occur when one or more switches saturate a path between a source and a destination in the network, leading to congestion and high latency for any other nodes attempting to send data through the path. Unfairness can also occur within a switch, when one or more ports of the switch connected to a set of nodes have a higher throughput than other ports of the switch connected to other nodes. As a result, the nodes connected to the slower ports are unable to inject data at the same speed as the nodes connected to the faster ports of the same switch.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
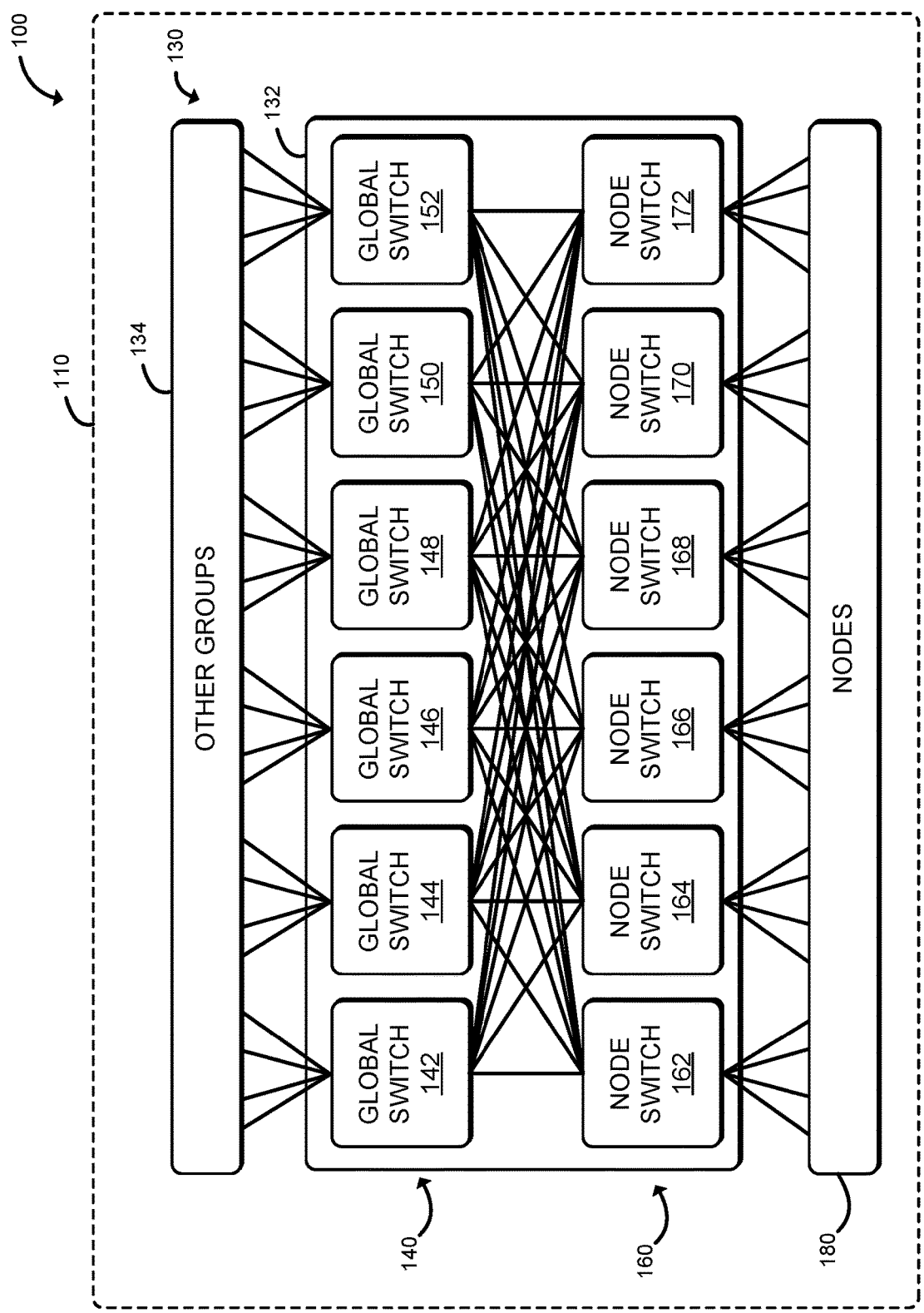
FIG. 1 is a simplified block diagram of at least one embodiment of a system for managing fairness to improve throughput in a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative system 100 for managing fairness to improve throughput in a network 110 includes a switch set 130 of groups 132, 134 that are in communication via the network 110. Each group 132, 134, in the illustrative embodiment, includes a set of global switches 140 and a set of node switches 160 connected to the global switches 140. The global switches 140 of each group 132, 134 connect to corresponding global switches 140 of other groups 134. The node switches 160 within the group 132 are each connected to a set of corresponding nodes 180. The nodes 180 may be embodied as any devices capable of executing workloads, such as processes, applications, or other tasks and that, in operation, send and receive units of data (e.g., packets) through the network 110. In the illustrative embodiment, the global switches 140 include global switches 142, 144, 146, 148, 150, and 152. Similarly, the node switches 160, in the illustrative embodiment, include node switches 162, 164, 166, 168, 170, and 172. While six global switches 140 and six node switches 160 are shown in FIG. 1, it should be understood that in other embodiments, each group 132, 134 may include any number of global switches 140 and node switches 160. In some embodiments, global switches and node switches are merged (i.e. flattened) into the same physical switch. In the illustrative embodiment, the other groups 134 include a similar topology as the group 132. However, in other embodiments, the other groups 134 may each contain just a single switch (e.g., in a 3-level fat tree topology). In the illustrative embodiment, in operation, each node switch 160 in the group may detect unfairly treated nodes 180 (e.g., those nodes that are experiencing disproportionately low data injection rates) connected to the corresponding node switch 160 (e.g., the node switch 162) and allow those unfairly treated nodes to route non-minimally (e.g., to send data packets through a path that requires more switch hops than another available path), regardless of output port congestion (e.g., the latency or fullness of packet queues of the output ports associated with the various available paths). As such, the node switch 160 allows those unfairly treated nodes to consume more network resources (e.g., more switch hops) to overcome the unfairness (e.g., to inject data into the network at a faster rate). By contrast, in typical systems that provide adaptive routing, a non-minimal path is selected only if the minimal path is at least twice as congested as the non-minimal path. Additionally, in operation, each node switch 160 may throttle the injection rate of well-performing nodes 180 to increase the injection rate of poor performing nodes 180, thus improving network fairness without sacrificing average throughput. In doing so, as described in more detail herein, the node switch 160 detects unfairness across all of the node ports of the node switch 160. As the aggregate level of unfairness increases, the injection rate for the node ports (e.g., the ports of the node switch 160 that are connected to the nodes 180, as distinguished from the ports that are connected to other switches, such as the global switches 140) is throttled more. The throttling does not affect the already-slow nodes 180, but it does slow down the high performing nodes. As a result, the slow performing nodes 180 are given more network resources, thus improving their performance.

Figure 2:
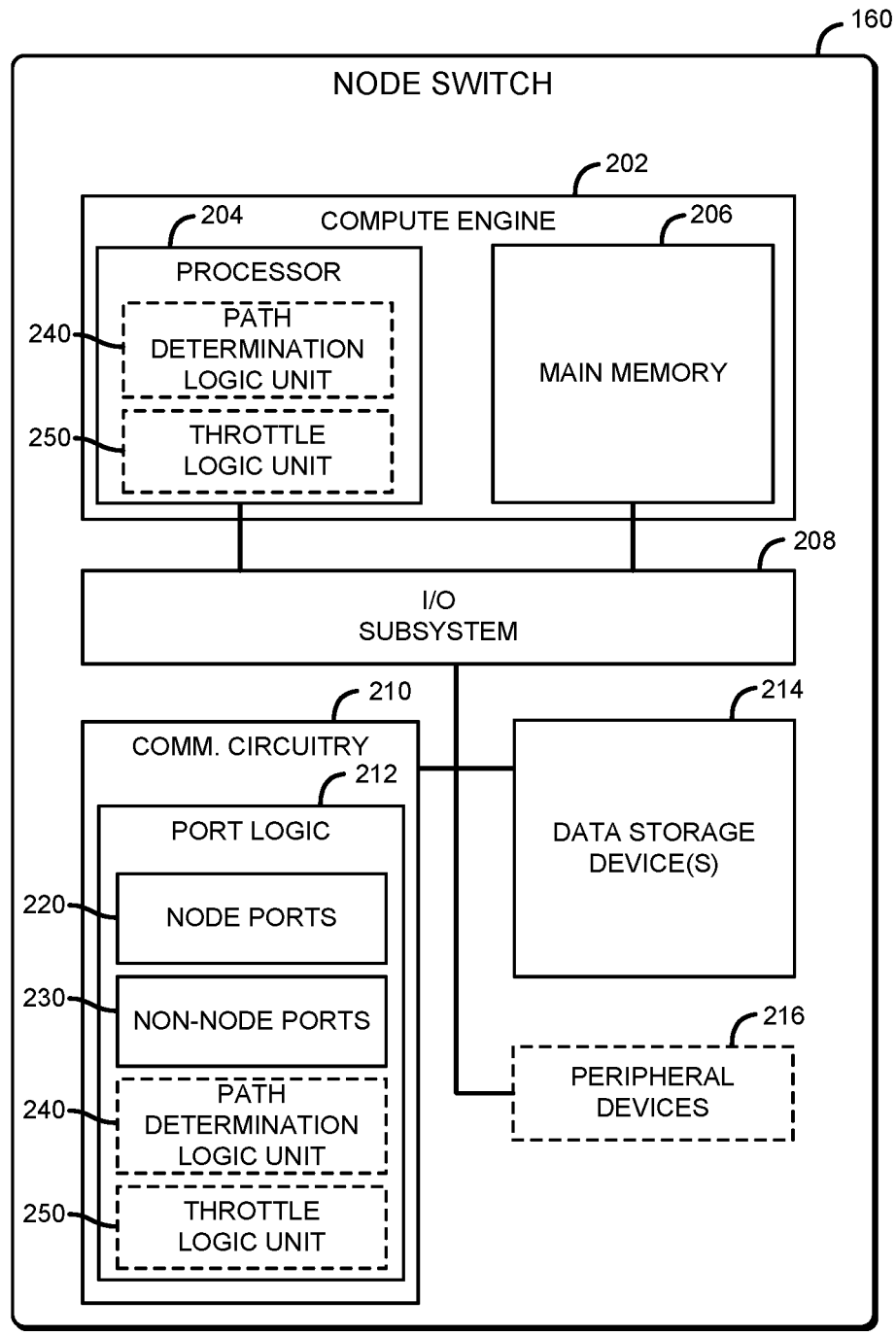
FIG. 2 is a simplified block diagram of at least one embodiment of a node switch of the system of FIG. 1.

Referring now to FIG. 2, each node switch 160 may be embodied as any type of compute device capable of performing the functions described herein, including comparing measured data transfer performance to the expected data transfer performance for the node switch 160, selectively forcing (e.g., without regard to the congestion level of corresponding output ports) units of data (e.g., a data packet or a portion of a data packet) through a non-minimal path, as a function of whether the measured performance satisfies the expected performance, and throttling a subset of the node ports to improve fairness across all of the node ports of the node switch 160.

As shown in FIG. 2, the illustrative node switch 160 includes a compute engine 202, an input/output (I/O) subsystem 208, communication circuitry 210, and one or more data storage devices 214. Of course, in other embodiments, the node switch 160 may include other or additional components, such as those commonly found in a computer (e.g., display, peripheral devices, etc.). Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a field-programmable gate array (FPGA), a system-on-a-chip (SOC), or other integrated system or device. Additionally, in some embodiments, the compute engine 202 includes or is embodied as a processor 204 and a memory 206. The processor 204 may be embodied as any type of processor capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an application specific integrated circuit (ASIC), reconfigurable hardware or hardware circuitry, or other specialized hardware to facilitate performance of the functions described herein. The processor 204 may include a path determination logic unit 240, which may be embodied as a specialized device, such as a co-processor, an FPGA, or an ASIC, for performing the determination of whether to force packets to be sent by the node switch 160 through a non-minimal path through the network 110 (e.g., regardless of the congestion level associated with the minimal path). Similarly, the processor 204 may include a throttle logic unit 250, which may be embodied as a specialized device, such as a co-processor, an FPGA, or an ASIC, for throttling node ports of the node switch 160 to balance resources (e.g., bandwidth) and improve fairness in the data injection rates of the nodes 180 connected to the node switch 160.

The main memory 206 may be embodied as any type of volatile (e.g., dynamic random access memory (DRAM), etc.) or non-volatile memory or data storage capable of performing the functions described herein. In some embodiments, all or a portion of the main memory 206 may be integrated into the processor 204. In operation, the main memory 206 may store various software and data used during operation such as packet data, performance data, path determination data, throttle data, applications, programs, libraries, and drivers.

The compute engine 202 is communicatively coupled to other components of the node switch 160 via the I/O subsystem 208, which may be embodied as circuitry and/or components to facilitate input/output operations with the compute engine 202 (e.g., with the processor 204 and/or the main memory 206) and other components of the node switch 160. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with one or more of the processor 204, the main memory 206, and other components of the node switch 160, into the compute engine 202.

The communication circuitry 210 may be embodied as any communication circuit, device, or collection thereof, capable of enabling communications over the network 110 between the node switch 160 and another device (e.g., a node 180 or global switch 140). The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 210 includes a port logic 212, which may also be referred to as a network interface controller (NIC) or a host fabric interface (HFI). The communication circuitry 210 may be located on silicon separate from the processor 204, or the communication circuitry 210 may be included in a multi-chip package with the processor 204 (e.g., in the compute engine 202), or even on the same die as the processor 204. The port logic 212 may be embodied as one or more add-in-boards, daughtercards, network interface cards, controller chips, chipsets, specialized components such as a field programmable gate array (FPGA) or application specific integrated circuit (ASIC), or other devices that may be used by the node switch 160 to connect with another device (e.g., a node 180 or global switch 140) and communicate data. In some embodiments, the port logic 212 may be embodied as part of a system-on-a-chip (SoC) that includes one or more processors, or included on a multichip package that also contains one or more processors. In some embodiments, the port logic 212 may include a local processor (not shown) and/or a local memory (not shown) that are both local to the port logic 212. In such embodiments, the local processor of the port logic 212 may be capable of performing one or more of the functions of the processor 204 described herein. Additionally or alternatively, in such embodiments, the local memory of the port logic 212 may be integrated into one or more components of the node switch 160 at the board level, socket level, chip level, and/or other levels. In the illustrative embodiment, the port logic 212 includes multiple node ports 220, also referred to herein as input ports, which may be embodied as any device or circuitry (e.g., a physical interface for a copper cable or an optical fiber, or a wireless transceiver) capable of communicatively connecting multiple nodes 180 to the node switch 160. Similarly, in the illustrative embodiment, the port logic 212 includes multiple non-node ports 230, also referred to herein as output ports, which may be embodied as any device or circuitry (e.g., a physical interface for a copper cable or an optical fiber, or a wireless transceiver) capable of communicatively connecting multiple devices other than nodes 180 (e.g., global switches 140) to the node switch 160. In some embodiments, the port logic 212 may include the path determination logic unit 240 and/or the throttle logic unit 250 described above with reference to the processor 204.

The one or more illustrative data storage devices 214 may be embodied as any type of devices configured for short-term or long-term storage of data such as, for example, memory devices and circuits, memory cards, hard disk drives, solid-state drives, or other data storage devices. Each data storage device 214 may include a system partition that stores data and firmware code for the data storage device 214. Each data storage device 214 may also include an operating system partition that stores data files and executables for an operating system. Additionally, the node switch 160 may include one or more peripheral devices 216. Such peripheral devices 216 may include any type of peripheral device commonly found in a compute device such as a display, speakers, a mouse, a keyboard, and/or other input/output devices, interface devices, and/or other peripheral devices.

The global switches 140 and nodes 180 may have components similar to those described in FIG. 2. The description of those components are equally applicable to the description of components of the node switch 160 and is not repeated herein for clarity of the description, with the exception that the nodes 180 may not include the path determination logic unit 240 and the throttle logic unit 250. Further, it should be appreciated that the global switches 140 and/or nodes 180 may include other components, sub-components, and devices commonly found in a computing device, which are not discussed above in reference to the node switch 160 and not discussed herein for clarity of the description.

As described above, the global switches 140, node switches 160, and nodes 180 are illustratively in communication via the network 110, which may be embodied as any type of wired or wireless communication network, including a fabric having a 3-level fat tree topology or other large scale indirect topology, one or more local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), global networks (e.g., the Internet), or any combination thereof.

Figure 3:
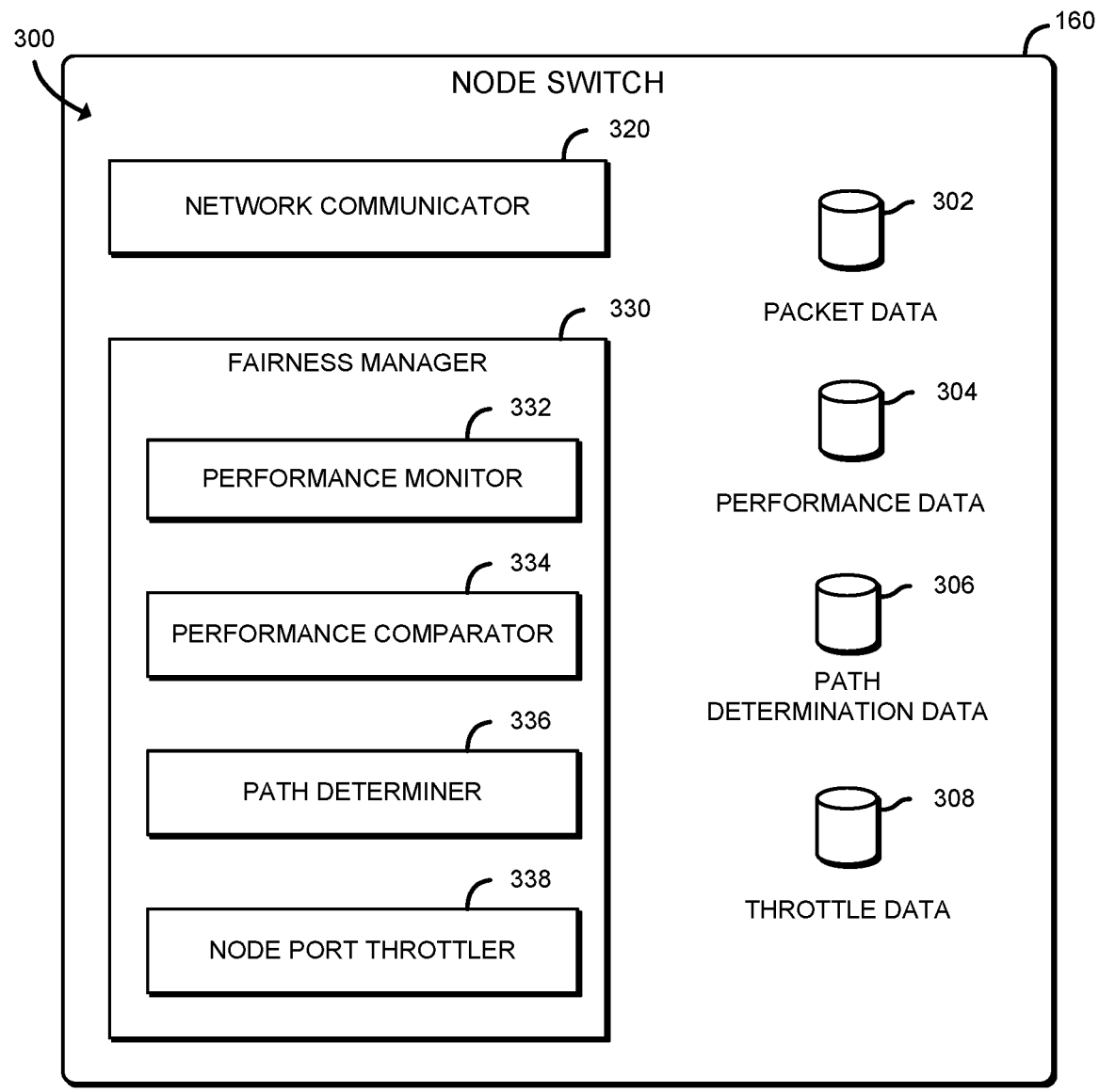
FIG. 3 is a simplified block diagram of an environment that may be established by the node switch of FIGS. 1 and 2.

Referring now to FIG. 3, in the illustrative embodiment, the node switch 160 may establish an environment 300 during operation. The illustrative environment 300 includes a network communicator 320 and a fairness manager 330. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, fairness manager circuitry 330, etc.). It should be appreciated that, in such embodiments, one or more of the network communicator circuitry 320 or fairness manager circuitry 330 may form a portion of one or more of the compute engine 202 (e.g., the processor 204 and/or the memory 206), the communication circuitry 210, the I/O subsystem 208, and/or other components of the node switch 160. In the illustrative embodiment, the environment 300 includes packet data 302 which may be embodied as any data indicative of units of data to be transferred by the node switch (e.g., in flits), as well as source address information and destination address information associated with the units of data (e.g., media access control (MAC) addresses, Internet Protocol (IP) addresses, etc.), the ports (e.g., node ports 220) from which the units of data were received, and the ports (e.g., non-node ports 230) to which the units are data are sent. Additionally, the illustrative environment 300 includes performance data 304 which may be embodied as any data indicative of an expected performance of the node switch 160 as a whole and, in the illustrative embodiment, of each port of the node switch 160. The expected performance data may be hardcoded, obtained from a service level agreement (SLA), or otherwise predefined and may be adjusted in accordance with changing network conditions.

For example, an expected level of performance may be reduced by the node switch 160 in response to determination that the network 110 is saturated (e.g., in response to a notification from an administrator, a fabric monitor device, etc.). The performance data 304, in the illustrative embodiment, additionally includes measured data indicative of an actual performance of the node switch 160 over a predefined window of time or number of cycles (e.g., 1,000 cycles). The metrics used for the expected performance and measured performance may be any metric indicative of the speed and/or efficiency with which the node switch 160 transfers units of data (e.g., data packets) from the nodes 180 to other devices (e.g., other switches) in the network 110, such as a throughput, an link potential (e.g., a measure of the number of flits transferred in a predefined number of cycles, and also the number of cycles that the input queue for the corresponding node port 220 was empty), or a fullness of input buffers of one or more ports 220, 230. The illustrative environment 300 also includes path determination data 306, which may be embodied as any data indicative of possible paths through which injected data (e.g., from each node 180) may be sent to a destination, including the numbers of switch hops for each path, an identification of the minimal path (e.g., the path with the least number of switch hops), one or more non-minimal paths (e.g., paths to the same destination that have more switch hops), and congestion information associated with each path (e.g., latency). The node switch 160 may obtain the path determination data 306 from other devices in the network 110 (e.g., other switches) such as via a dynamic routing protocol (e.g., the Routing Information Protocol (RIP), the Open Shortest Path First (OSPF) protocol, the Intermediate System to Intermediate System (IS-IS) protocol, the Interior Gateway Routing Protocol (IGRP) protocol, or similar protocol). Additionally, in the illustrative embodiment, the environment 300 includes throttle data 308 which may be embodied as any data indicative of an allowed data transfer rate to which the node ports 220 of the node switch 160 have been throttled, such as pursuant to a credit scheme, as described in more detail herein.

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the node switch 160, respectively. To do so, the network communicator 320 is configured to receive and process packets from one or more devices (e.g., one or more nodes 180) and to prepare and send packets to one or more devices (e.g., one or more global switches 140). Accordingly, in some embodiments, at least a portion of the functionality of the network communicator 320 may be performed by the communication circuitry 210, and, in the illustrative embodiment, by the port logic 212.

The fairness manager 330, which may be embodied as hardware, firmware, software, virtualized hardware, emulated architecture, and/or a combination thereof as discussed above, is configured to manage the fairness of the allocation of resources (e.g., bandwidth) to the nodes 180 by selectively forcing units of data from the nodes 180 to be sent through a non-minimal path to a destination and/or throttling the rate at which the node ports 220 receive units of data from the nodes 180. In the illustrative embodiment, the node switch 160 forces the use of non-minimal paths and throttles the data transfer rates of the node ports 220 as a function of whether the measured performance of the node ports 220 of the node switch 160 satisfies the expected performance of the node ports 220 of the node switch 160. To do so, in the illustrative embodiment, the fairness manager 330 includes a performance monitor 332, a performance comparator 334, a path determiner 336, and a node port throttler 338.

The performance monitor 332, in the illustrative embodiment, is configured to measure the performance of the node switch 160, and in the illustrative embodiment, the performance of each node port 220 and generate the measured performance data in the performance data 304, described above. In the illustrative embodiment, the performance monitor 332 generates the measured performance data for every instance of a predefined window of time, such as a predefined number of seconds or cycles of the node switch 160.

The performance comparator 334, in the illustrative embodiment, is configured to compare the measured performance data to the expected performance data to determine whether the measured performance of the node switch 160 satisfies the expected performance. In doing so, the performance comparator 334 may determine whether the measured performance is within a predefined range (e.g., 5%) of the expected performance. If the measured performance is not within the predefined range of the expected performance, the performance comparator 334, in the illustrative embodiment, determines that the measured performance does not satisfy the expected performance. Otherwise, in the illustrative embodiment, the performance comparator 334 determines that the measured performance does satisfy the expected performance. The performance comparator 334 may compare a measure performance associated with the node switch 160 as a whole to a corresponding expected performance and/or may compare a measured performance to an expected performance on a port-by-port basis, as described in more detail herein with respect to the throttling of the node ports 220.

The path determiner 336, in the illustrative embodiment, is configured to determine whether to force units of data (e.g., data packets) through a non-minimal path to their destination or to determine the path for the units of data according to a standard adaptive routing scheme (e.g., to send a data unit along a minimal path unless the minimal path is at least twice as congested as an available non-minimal path). In the illustrative embodiment, the path determiner 336 selects whether to force the units of data through a non-minimal path as a function of whether the performance data 304 indicates that the measured performance of the node switch 160 does not satisfy the expected performance, as determined by the performance comparator 334. In response to a determination that the measured performance does not satisfy the expected performance, the path determiner 336, in the illustrative embodiment, increments a counter that affects the likelihood that the path determiner 336 will determine to force the units of data through a non-minimal path. By contrast, if the measured performance does satisfy the expected performance, the path determiner 336, in the illustrative embodiment, decrements the counter, thereby reducing the likelihood that the path determiner 336 will force units of data through a non-minimal path, and will instead perform adaptive routing (e.g., selection of a non-minimal path or the minimal path based on their respective congestion levels). The path determiner 336 may selectively increment or decrement the counter each time the performance comparator 334 makes a determination of whether the measured performance satisfies the expected performance (e.g., every thousand cycles or other predefined time period).

The node port throttler 338, in the illustrative embodiment, is configured to adjust the allowed traffic rate for the node ports 220 as a function of whether the measured data transfer performance satisfies the expected data transfer performance for each node port 220. The allowed traffic rate, in the illustrative embodiment, is a speed at which to transfer units of data from the nodes 180 in communication with the respective node ports 220 to upstream devices (e.g., global switches 140, an output port 230 of the node switch 160, a sub-switch within the node switch 160, etc.). In the illustrative embodiment, the node port throttler 338 controls the allowed traffic rate by selectively increasing or decreasing an amount of credits to be accumulated by the node ports 220 in each cycle of the node switch 160. When a node port 220 has at least one credit, it may then consume the credit (e.g., reduce the amount of available credits by one) and send a unit of data (e.g., all or a portion of a data packet) received from a node 180 to an upstream device, as described above. In the illustrative embodiment, if the measured performance does not satisfy the expected performance, the node port throttler 338 decreases the allowed traffic rate for all of the node ports 220 and if the measured performance does satisfy the expected performance, the node port throttler 338 increases the allowed traffic rate for all of the node ports 220.

It should be appreciated that each of the performance monitor 332, the performance comparator 334, the path determiner 336, and the node port throttler 338 may be separately embodied as hardware, firmware, software, virtualized hardware, emulated architecture, and/or a combination thereof. For example, the performance monitor 332 may be embodied as a hardware component, while each of the performance comparator 334, the path determiner 336, and the node port throttler 338 is embodied as a virtualized hardware component or as some other combination of hardware, firmware, software, virtualized hardware, emulated architecture, and/or a combination thereof.

Figure 4:
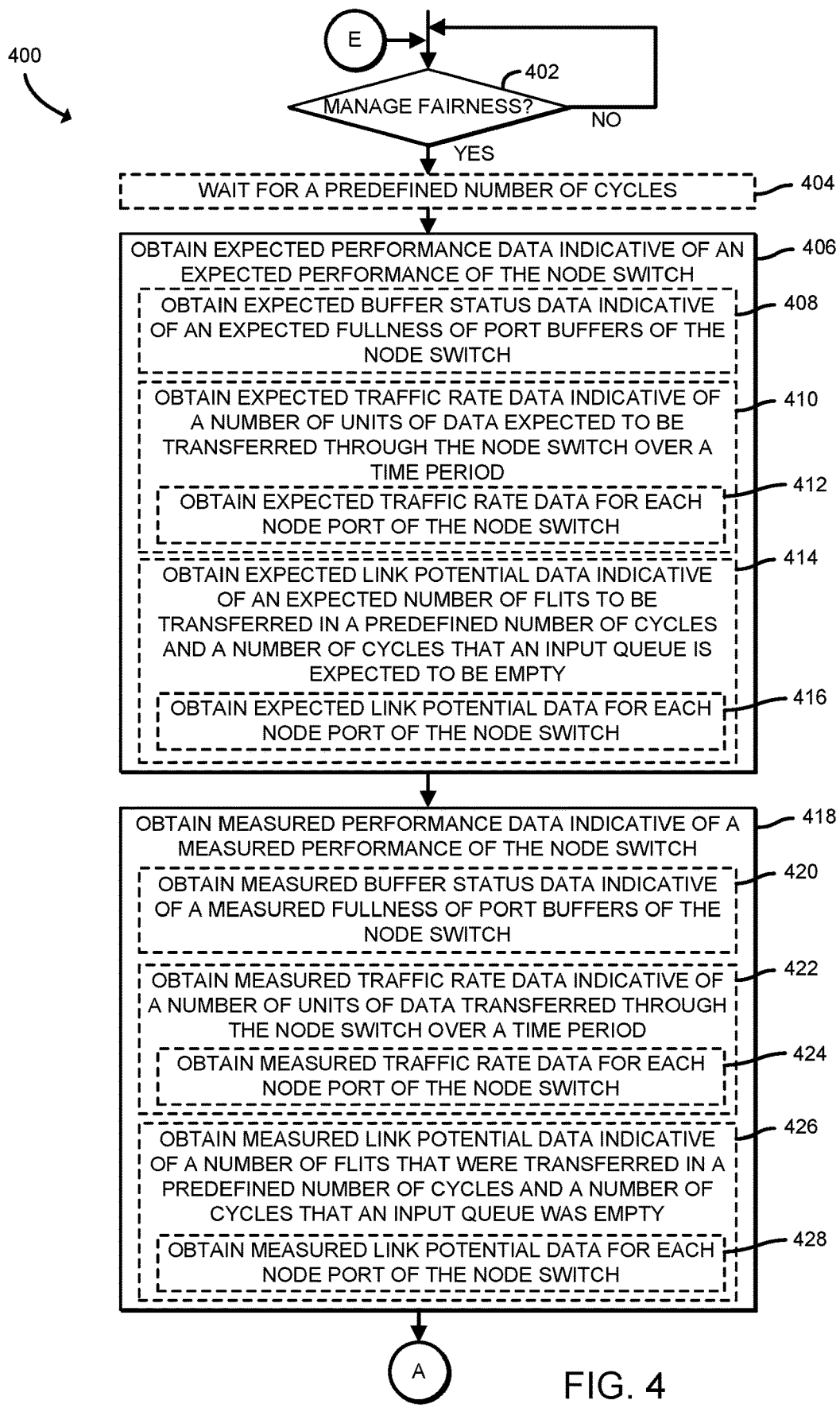
FIGS. 4-8 are a simplified flow diagram of at least one embodiment of a method for managing fairness that may be performed by the node switch of FIGS. 1-3.

Referring now to FIG. 4, in the illustrative embodiment, each node switch 160 may execute a method 400 for managing fairness. The method 400 begins with block 402, in which the node switch 160 determines whether to manage fairness. In the illustrative embodiment, the node switch 160 determines to manage fairness if the node switch 160 is powered on and has detected the presence of the path determination logic unit 240 and/or the throttle logic unit 250. In other embodiments, the node switch 160 may determine to manage fairness based on additional or alternative factors, such as in response to receiving a request from another compute device (e.g., an administrator compute device) to manage fairness, in response to detecting a corresponding setting in a configuration file, and/or other factors. Regardless, in response to a determination to manage fairness, the method 400 advances to block 404 in which the node switch 160 may wait a predefined number of cycles (e.g., a thousand cycles) or time period. During the waiting time, the node switch 160 may route units of data (e.g., all or a portion of a data packet) through the network 110 and collect performance data of the node switch 160 and the node ports 220 within the node switch 160 (e.g., buffer fullness, throughput, link potential, etc.). Subsequently, in block 406, node switch 160 obtains (e.g., receives or generates internally) expected performance data indicative of the expected performance of the node switch 160. The expected performance data may be hard coded, read from a configuration file, received from an administrator compute device, or obtained from another source. In obtaining the expected performance data, the node switch 160 may obtain expected buffer status data indicative of an expected fullness of the buffers of one or more of the ports (e.g., the node ports 220 and/or the non-node ports 230), as indicated in block 408. For example, the fullness may be expressed as a fraction or percentage (e.g., 50%) of each buffer. Additionally or alternatively, and as indicated in block 410, the node switch 160 may obtain expected traffic rate data indicative of a number of units of data expected to be transferred through the node switch 160 over a predefined time period (e.g., each second). In doing so, and as indicated in block 412, the node switch 160 may obtain expected traffic rate data for each node port 220 of the node switch 160 (e.g., an expected amount of data units transferred by each node port 220 each second). Additionally or alternatively, the node switch 160 may obtain expected link potential data indicative of a measure of an expected number of flits to be transferred in a predefined number of cycles, and also the number of cycles that the an input queue of the node switch 160 is expected to be empty, as indicated in block 414. In doing so, and as indicated in block 416, the node switch 160 may obtain expected link potential data for each node port 220 of the node switch 160 (e.g., on a node port by node port basis, rather than for the node switch 160 as a whole).

Figure 9:
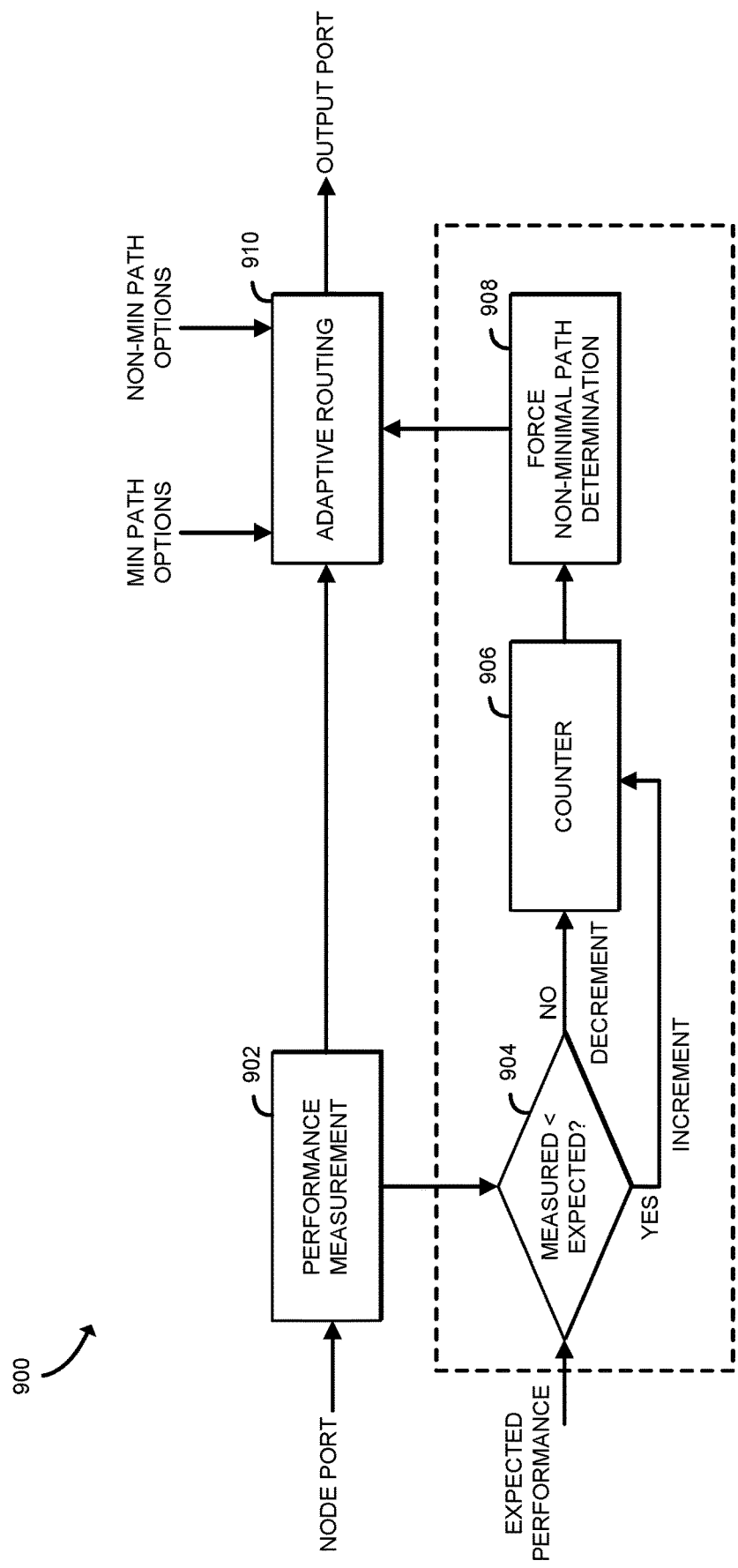
FIG. 9 is a simplified block diagram of at least one embodiment of logical components that may be utilized by the node switch of FIGS. 1-3 to force the selection of non-minimal paths for sending units of data through the network to improve fairness.
Figure 10:
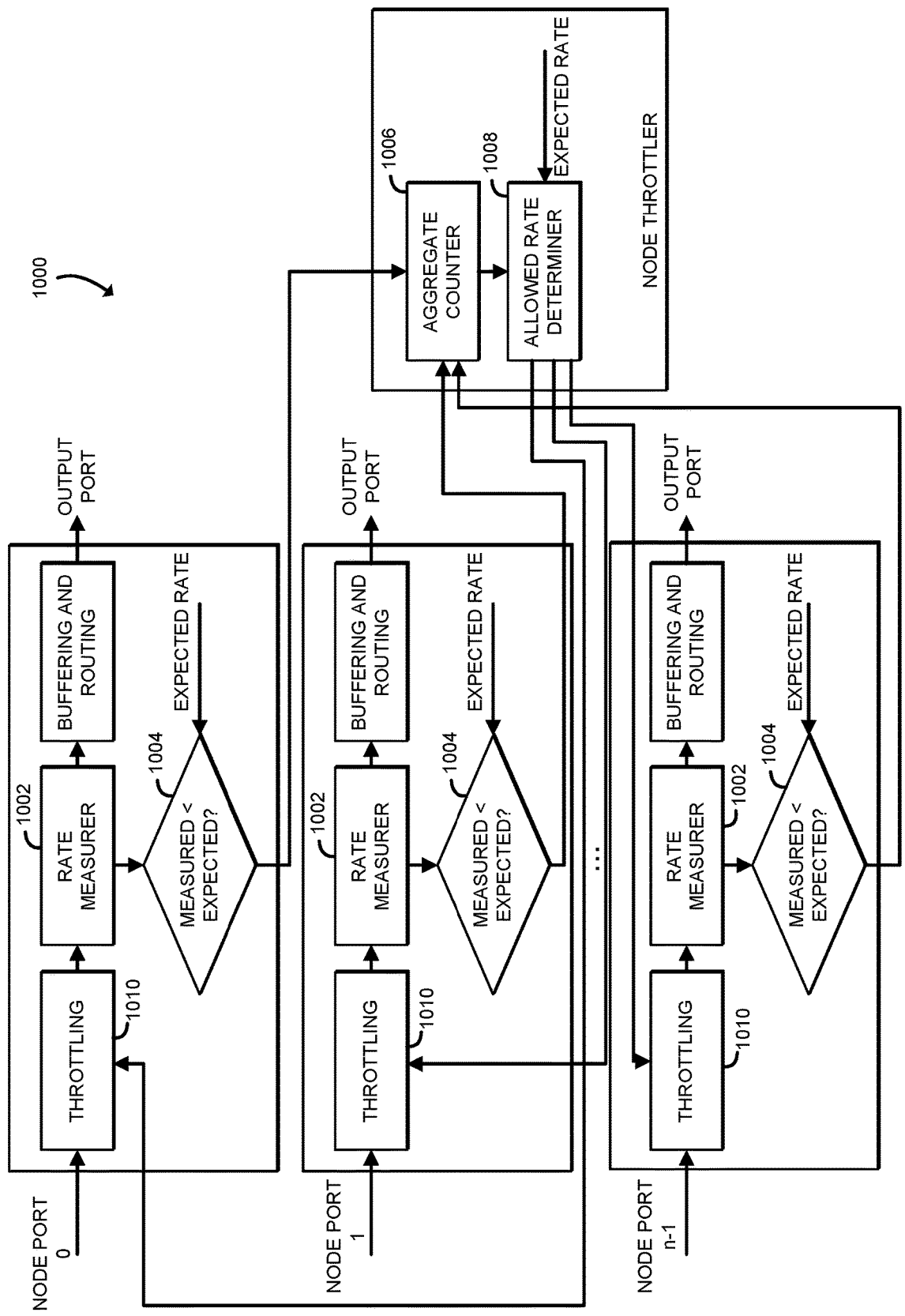
FIG. 10 is a simplified block diagram of at least one embodiment of logical components that may be utilized by the node switch of FIGS. 1-3 to throttle node ports of the node switch to improve fairness.

In block 418, the node switch 160, in the illustrative embodiment, may obtain (e.g., receive or generate internally) measured performance data indicative of a measured performance of the node switch 160. In doing so, and as indicated in block 420, the node switch 160 may obtain measured buffer status data indicative of a measured fullness of port buffers (e.g., the node ports 220 and/or the non-node ports 230) of the node switch 160. Additionally or alternatively, the node switch 160 may obtain measured traffic rate data indicative of a number of units of data transferred through the node switch 160 over a time period (e.g., per second), as indicated in block 422. In doing so, and as indicated in block 424, the node switch 160 may obtain measured traffic rate data for each node port 220 of the node switch 160. Additionally or alternatively, and as indicated in block 426, the node switch 160 may obtain measured link potential data indicative of the number of flits that were transferred in a predefined number of cycles, and also the number of cycles that an input queue of the node switch 160 was empty. In doing so, and as indicated in block 428, the node switch 160 may obtain measured link potential data for each node port 220 of the node switch 160. Block 418 corresponds to block 902 in the block diagram 900 of FIG. 9 and to block 1002 in the block diagram 1000 of FIG. 10. Subsequently, the method 400 advances to block 430 of FIG. 5, in which the node switch 160 obtains potential path data.

Figure 5:
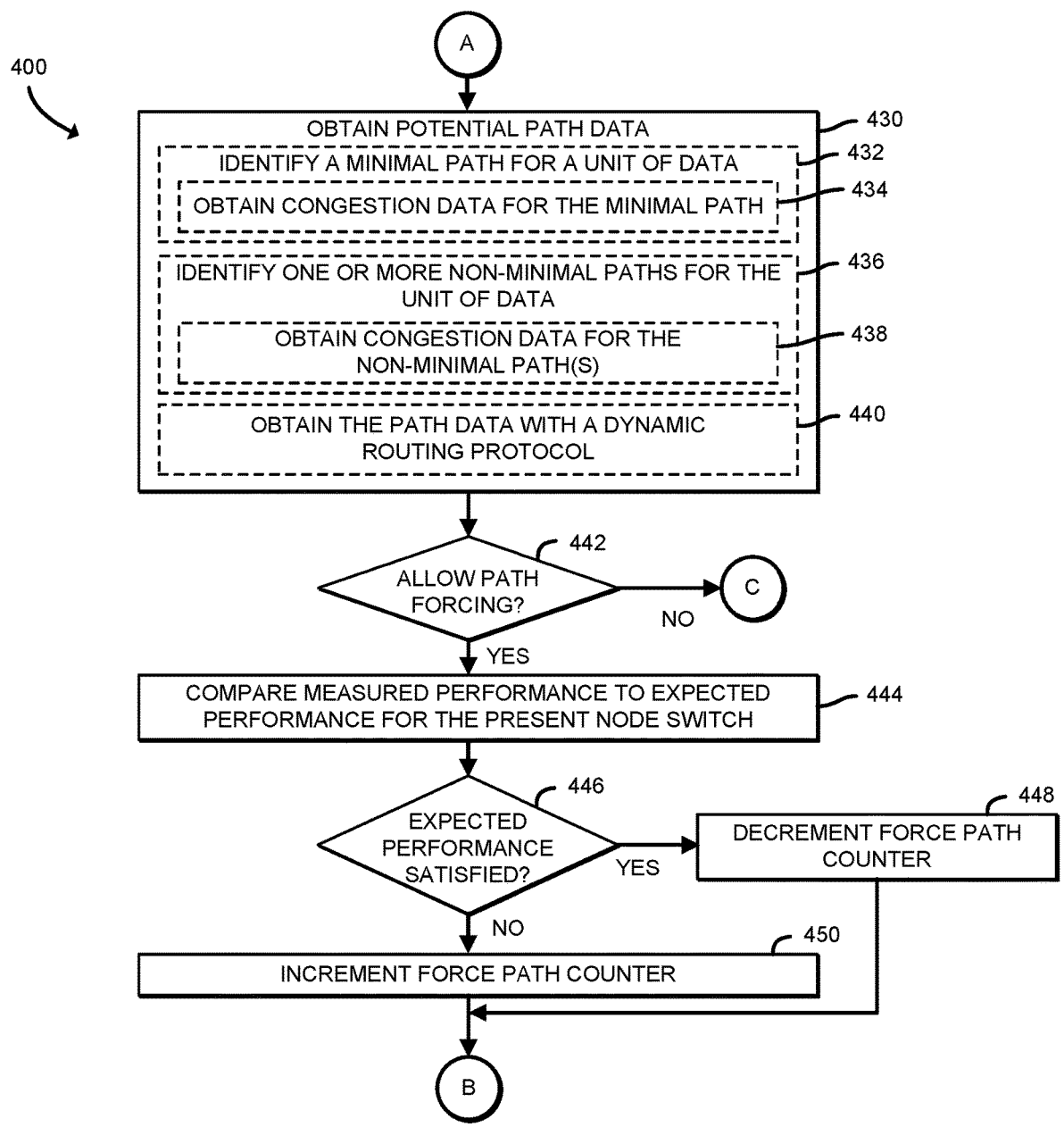

Referring now to FIG. 5, in obtaining the potential path data, the node switch 160 may identify a minimal path for a unit of data, as indicated in block 432. The minimal path, in the illustrative embodiment, is a path to a destination (e.g., to another node 180) that requires the least amount of switch hops (e.g., a transfer of the data unit from one switch to another switch) of any possible path. In identifying the minimal path, the node switch 160 may also obtain congestion data for the minimal path (e.g., a latency, a number of data units being transferred through the path, buffer fullness information for the output port associated with the minimal path, etc.), as indicated in block 434. As indicated in block 436, the node switch 160 may also identify one or more non-minimal paths for a unit of data (e.g., paths that require more switch hops than the minimal path to reach the destination). In doing so, the node switch 160 may obtain congestion data for each non-minimal path (e.g., a latency, a number of data units being transferred through the path, buffer fullness information for the output port associated with the minimal path, etc.), as indicated in block 438. The node switch 160 may obtain the potential path data using a dynamic routing protocol (e.g., the Routing Information Protocol (RIP), the Open Shortest Path First (OSPF) protocol, the Intermediate System to Intermediate System (IS-IS) protocol, the Interior Gateway Routing Protocol (IGRP) protocol, or similar protocol), as indicated in block 440.

In block 442, the node switch 160 determines whether to allow path forcing (e.g., potential forcing of data units through a non-minimal path regardless of how congested the minimal path is relative to the non-minimal paths). In the illustrative embodiment, the node switch 160 determines to allow possible forcing of non-minimal paths if the node switch 160 has detected the presence of the path determination logic unit 240 in the node switch 160 (e.g., in the processor 204 or in the port logic 212), in response to reading a corresponding setting in a configuration file, and/or in response to a request from an administrator compute device to enable possible forcing of non-minimal paths. In other embodiments, the node switch 160 makes the determination based on other factors. Regardless, in response to a determination not to enable possible forcing of non-minimal paths, the method 400 advances to block 476 of FIG. 7 to determine whether to enable possible node port throttling, as described in more detail herein. However, in response to a determination to enable possible forcing of non-minimal paths, the method 400 advances to block 444 in which the node switch 160 compares the measured performance to the expected performance, as indicated in block 444. In doing so, the node switch 160 may determine whether the measured performance is within a predefined range of the expected performance (e.g., 5%) or is equal to, greater than, or less than a threshold value indicated in the expected performance data. In block 446, which corresponds with block 904 of FIG. 9, the node switch 160 determines the subsequent operations to perform as a function of whether the measured performance satisfied the expected performance. In response to a determination that the measured performance does satisfy the expected performance, the method 400 advances to block 448, in which the node switch 160 decrements a counter, referred to herein as a force path counter. If, on the other hand, the measured performance does not satisfy the expected performance, the method 400 advances to block 450, in which the node switch 160 increments the force path counter. Blocks 448 and 450 correspond with block 906 of FIG. 9. Regardless of whether the force path counter was decremented or incremented, the method 400 subsequently advances to block 452 of FIG. 6, in which the node switch 160 determines whether to force the use of a non-minimal path (e.g., to force data units to be sent through a non-minimal path regardless of the congestion level of the minimal path), as a function of the force path counter. Block 452 corresponds with block 908 of FIG. 9.

Figure 6:
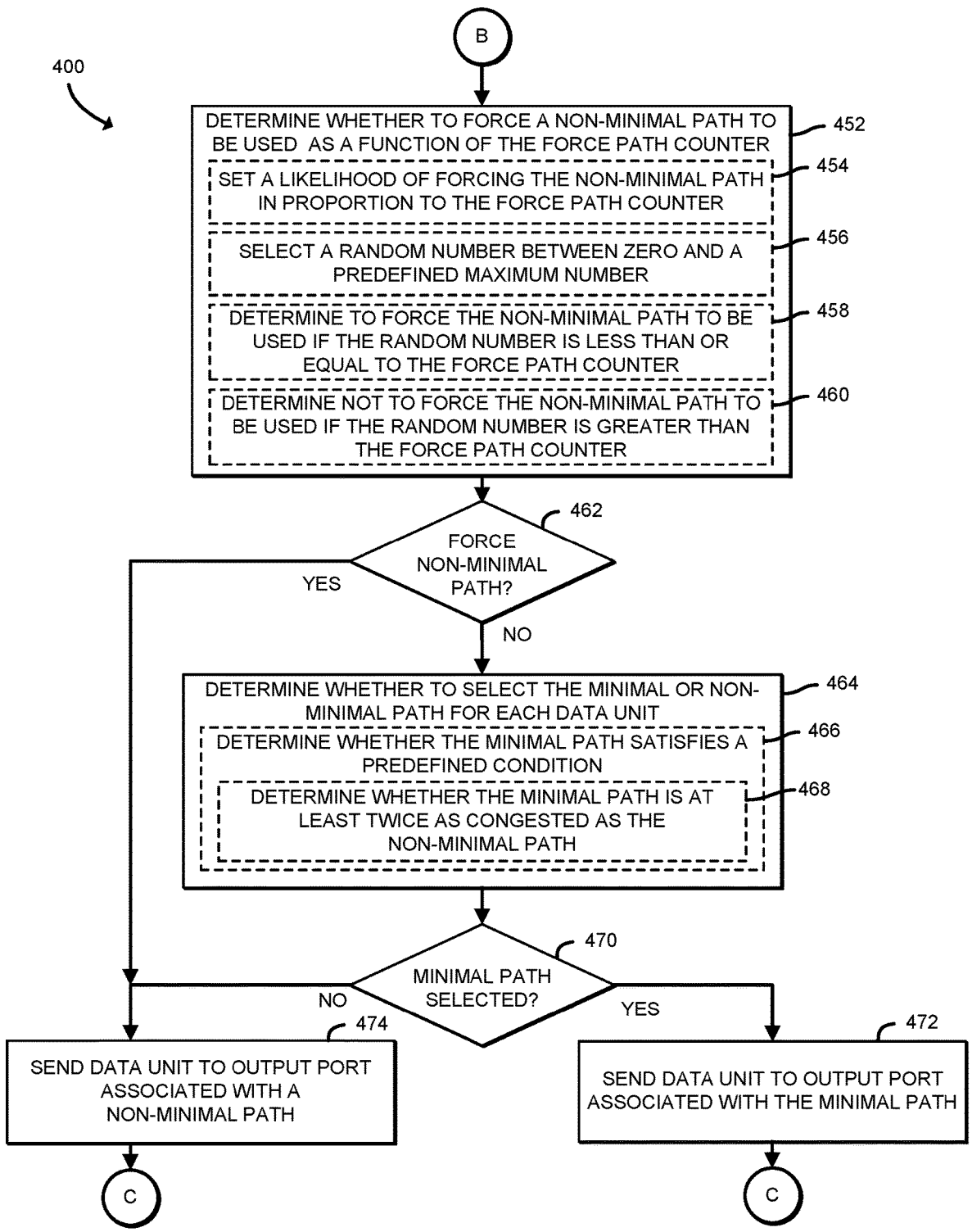

Referring now to FIG. 6, in block 454, in determining whether to force a non-minimal path to be used, the node switch 160 may set a likelihood of forcing the non-minimal path in proportion to the value of the force path counter (e.g., an increase in the value of the force path counter increases the likelihood of the node switch 160 forcing a non-minimal path to be used and a decrease in the value of the force path counter causes a corresponding decrease in the likelihood of forcing the use of a non-minimal path). As indicated in block 456, the node switch 160 may select a random number between zero and a predefined maximum number (e.g., ten). In block 458, the node switch 160 may determine to force the use of a non-minimal path if the random number is less than or equal to the force path counter. Alternatively, as indicated in block 460, the node switch 160 may determine not to force the non-minimal path to be used if the random number is greater than the force path counter. Subsequently, in block 462, the node switch 160 determines the subsequent actions to perform as a function of whether the node switch 160 determined to force the use of a non-minimal path. In response to a determination to force the use of a non-minimal path, the method 400 advances to block 474, in which the node switch 160 sends data units (e.g., data packets) to output ports associated with a non-minimal path. However, if the node switch 160 instead determined not to force the use of a non-minimal path, the method 400 advances to block 464, in which the node switch 160 determines whether to select the minimal path or a non-minimal path for each unit of data. In doing so, the node switch 160 determines whether the minimal path for a given data unit (e.g., the minimal path to the destination for a data packet) satisfies a predefined condition, as indicated in block 466. In determining whether the minimal path satisfies the predefined condition, the node switch 160 may determine whether the minimal path is at least twice as congested as the non-minimal path(s) (e.g., using the potential path data obtain in block 430), as indicated in block 468. In the illustrative embodiment, if the minimal path is at least twice as congested as the non-minimal path(s), the node switch 160 selects a non-minimal path for use. Otherwise, the node switch 160 selects the minimal path for use. In block 470, the node switch 160 determines the subsequent actions to perform as a function of whether the node switch 160 selected the minimal path or a non-minimal path for use. If the node switch 160 selected the minimal path, the method 400 advances to block 474, in which the node switch 160 sends the data unit to an output port 230 associated with the non-minimal path. Otherwise, the method 400 advances to block 472, in which the node switch 160 sends the data unit to the output port 230 associated with the minimal path. Subsequently, the method 400 advances to block 476 of FIG. 7, in which the node switch 160 determines whether to enable possible throttling. Blocks 462 through 472 correspond to block 910 of FIG. 9.

Figure 7:
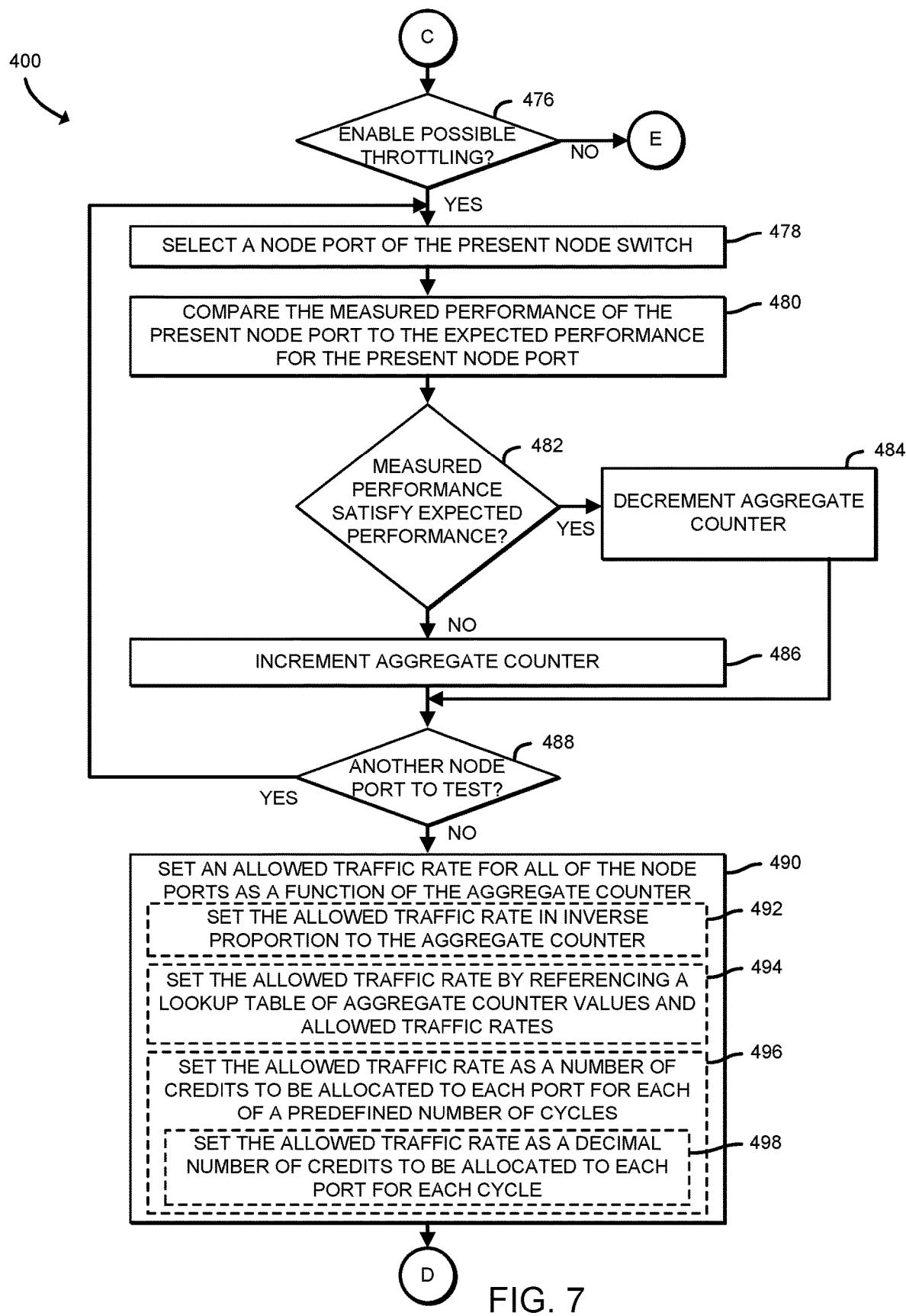

Referring now to FIG. 7, in determining whether to enable possible throttling, the node switch 160 may determine to allow possible throttling if the node switch 160 has detected the presence of the throttle logic unit 250 in the node switch 160 (e.g., in the processor 204 or in the port logic 212), in response to reading a corresponding setting in a configuration file, and/or in response to a request from an administrator compute device to enable possible throttling. In other embodiments, the node switch 160 makes the determination based on other factors. Regardless, in response to a determination not to enable possible throttling, the method 400 loops back to block 402 of FIG. 4, to determine whether to continue managing fairness. Otherwise, the method 400 advances to block 478 in which the node switch 160 initiates a process of determining whether each node port 220 of the node switch 160 has satisfied its corresponding expected performance. In doing so, in block 478, the node switch 160 selects a node port 220 of the node switch 160. In block 480, the node switch 160 compares the measured performance (e.g., from block 418) with the expected performance (e.g., from block 406) for the node port 220 to determine whether the measured performance satisfies the expected performance. In doing so, the node switch 160 may perform a similar comparison to that described with reference to blocks 444 and 446 of FIG. 5, except at the node port level (e.g., with reference to the expected and measured performance of the selected node port 220) rather than at the node switch 160 level. In block 482, the node switch 160 determines the subsequent actions to perform as a function of whether the measured performance for the selected node port 220 satisfies the expected performance. If so, the method 400 advances to block 484, in which the node switch 160 decrements a counter, referred to herein as the aggregate counter. Otherwise, the method 400 advances to block 486, in which the node switch 160 increments the aggregate counter. Regardless of whether the node switch 160 decrements or increments the aggregate counter, the method 400 subsequently advances to block 488 in which the node switch 160 determines whether another node port 220 is available to be tested (e.g., whether the node switch 160 has performed the above process for each of the node ports 220 present on the node switch 160). If there is another node port 220 to test, the method 400 loops back to block 478 to select another available node port 220 and perform the above process again, for the selected node port 220. Blocks 478 through 488 correspond with blocks 1004, 1006 of FIG. 10. Otherwise, the method 400 advances to block 490 in which the node switch 160 sets an allowed traffic rate for all of the node ports 220 as a function of the aggregate counter. Block 490 corresponds with block 1008 of FIG. 10.

Figure 8:
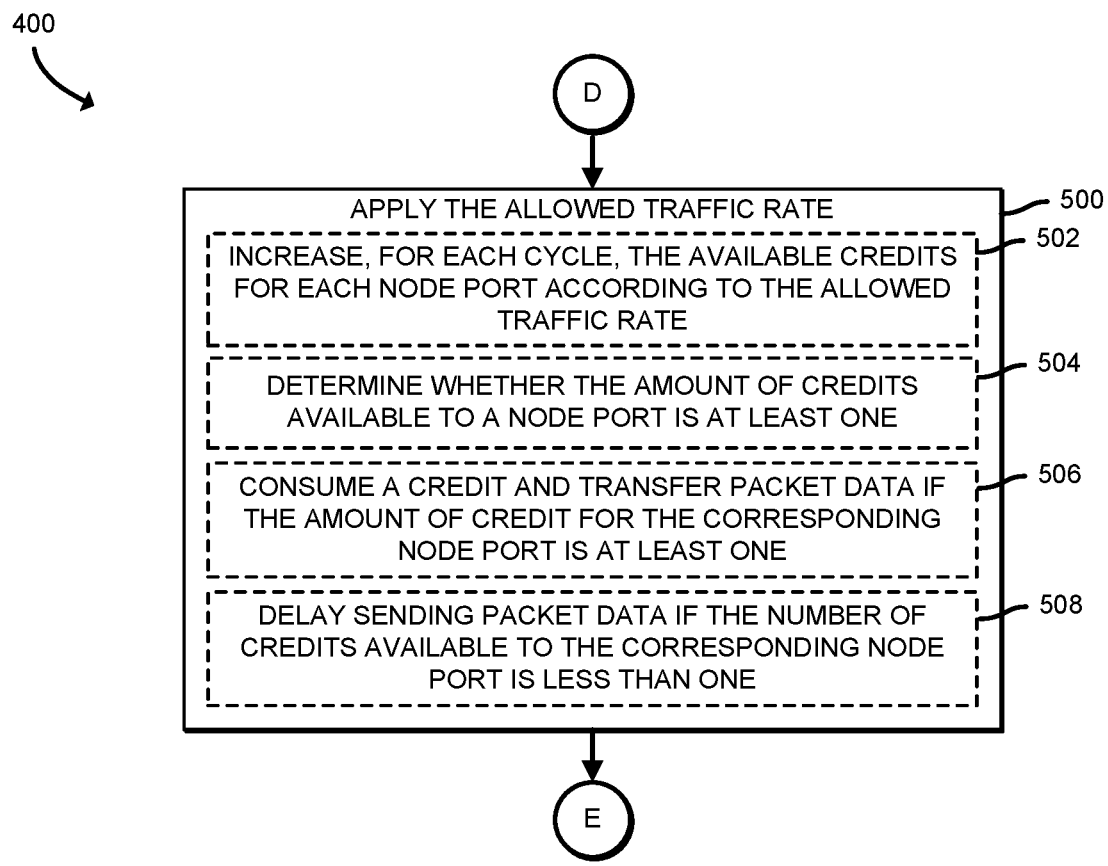

In setting the allowed traffic rate, the node switch 160 may set the allowed traffic rate in inverse proportion to the value of the aggregate counter (e.g., an increase in the aggregate counter results in a decrease in the allowed traffic rate, and a decrease in the aggregate counter results in an increase in the allowed traffic rate), as indicated in block 492. In some embodiments, the node switch 160 may set the allowed traffic rate by referencing a lookup table of aggregate counter values and corresponding allowed traffic rates, as indicated in block 494. The lookup table may be included in the throttle data 308 of FIG. 3. As indicated in block 496, the node switch 160 may set the allowed traffic rate as a number of credits to be allocated to each port (e.g., each node port 220) for each of a predefined number of cycles (e.g., for each cycle). In doing so, the node switch 160 may set the allowed traffic rate as a decimal number of credits to be allocated to each port (e.g., each node port 220) for each cycle, as indicated in block 498. For instance, to set a relatively low allowed traffic rate, the node switch 160 may determine to allocate 0.1 credits to each node port 220 for each cycle. By contrast, to set a relatively high allowed traffic rate, the node switch 160 may determine to allocate 0.8 credits to each node port 220 for each cycle. Subsequently, the method 400 advances to block 500 of FIG. 8, in which the node switch 160 applies the allowed traffic rate to throttle the node ports 220. Block 500 corresponds with block 1010 of FIG. 10.

Figure 11:
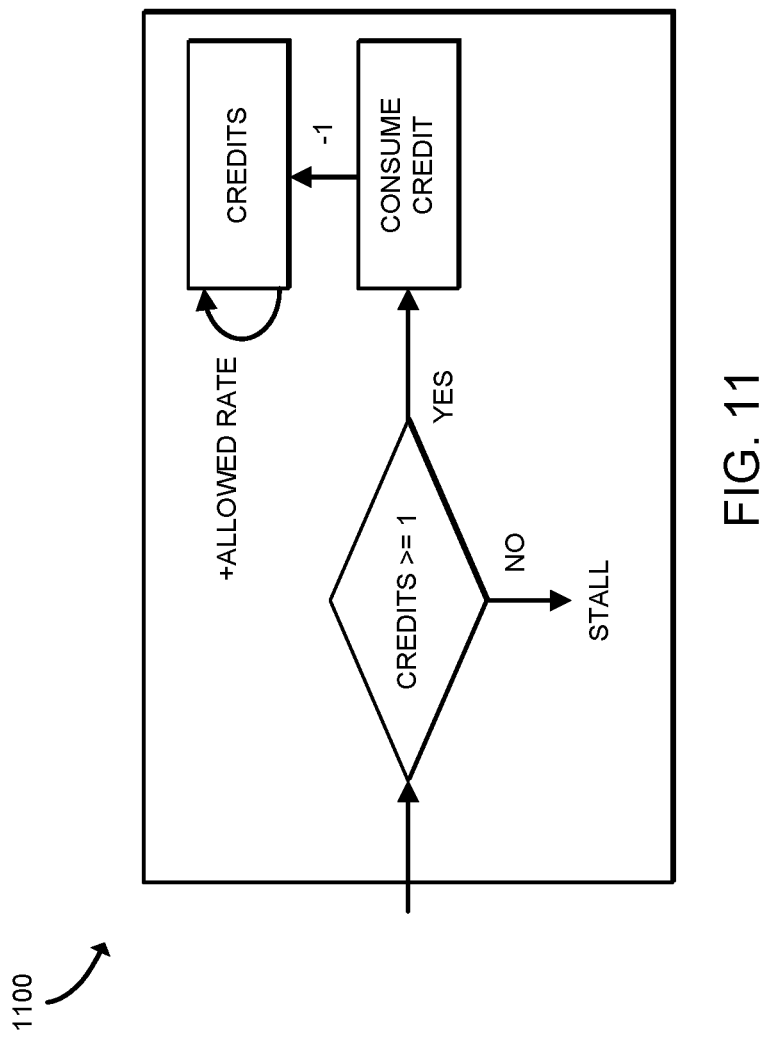
FIG. 11 is a simplified block diagram of at least one embodiment of logical components that may be utilized by the node switch of FIGS. 1-3 to enforce a data transfer rate for the node ports of the node switch using a credit scheme.

In applying the allowed traffic rate, the node switch 160 may increase, for each cycle, the available credits for each node port 220 according to the allowed traffic rate, as indicated in block 502. In block 504, the node switch 160 may determine whether the amount of credits available to a node port 220 is at least one and, in block 506, the node switch 160 may consume a credit and transfer a corresponding data unit (e.g., to an output port 230) if the amount of credit for the corresponding node port 220 is at least one. Otherwise, and as indicated in block 508, the node switch 160 may delay sending the data unit if the number of credits available to the corresponding node port is less than one. Blocks 502 through 508 correspond with the block diagram 1100 of FIG. 11. In the illustrative embodiment, the node switch 160 performs the above process for each node port 220 of the node switch 160. The effect of the throttle is to slow down fast node ports 220 to free-up resources (e.g., reduce contention for switching capacity) for slower node ports 220. As a result of applying the above process, if the incoming rate of data units from a node 180 to a corresponding node port 220 is lower than the allowed traffic rate, the throttling has no effect, as there will always be a credit available for each incoming data unit.

EXAMPLES

Illustrative examples of the technologies disclosed herein are provided below. An embodiment of the technologies may include any one or more, and any combination of, the examples described below.

Example 1 includes a node switch for improving throughput in a network, the node switch comprising a compute engine; and communication circuitry coupled to the compute engine, wherein the communication circuitry includes a plurality of node ports to transfer data to and from nodes; and a plurality of output ports to transfer data to and from other devices, wherein the compute engine is to obtain expected performance data indicative of an expected data transfer performance of the node switch; obtain measured performance data indicative of a measured data transfer performance of the node switch; compare the measured performance data to the expected performance data to determine whether the measured data transfer performance satisfies the expected data transfer performance; determine, as a function of whether the measured data transfer performance satisfies the expected data transfer performance, whether to force a unit of data through a non-minimal path to a destination; and send, in response to a determination to force the unit of data to be sent through a non-minimal path, the unit of data to an output port of the node switch associated with the non-minimal path.

Example 2 includes the subject matter of Example 1, and wherein the compute engine is further to determine, in response to a determination not to force the unit of data to be sent through a non-minimal path, whether the minimal path satisfies a predefined condition; and send, in response to a determination that the minimal path does not satisfy the predefined condition, the unit of data to an output port of the node switch associated with the minimal path.

Example 3 includes the subject matter of any of Examples 1 and 2, and wherein the compute engine is further to determine, in response to a determination not to force the unit of data to be sent through a non-minimal path, whether the minimal path satisfies a predefined condition; and send, in response to a determination that the minimal path does satisfy the predefined condition, the unit of data to the output port associated with non-minimal path.

Example 4 includes the subject matter of any of Examples 1-3, and wherein to determine whether the minimal path satisfies a predefined condition comprises to determine whether the minimal path is at least twice as congested as the non-minimal path.

Example 5 includes the subject matter of any of Examples 1-4, and wherein to determine whether to force the unit of data to be sent through the non-minimal path comprises to increment, in response to a determination that the measured data transfer performance does not satisfy the expected data transfer performance, a counter; decrement, in response to a determination that the measured data transfer performance does satisfy the expected data transfer performance, the counter; and set, as a function of the counter, a likelihood of forcing the unit of data to be sent through the non-minimal path.

Example 6 includes the subject matter of any of Examples 1-5, and wherein the compute engine is further to select a random number between zero and a predefined maximum number; determine, in response to a determination that the selected random number is less than or equal to the counter, to force the unit of data to be sent through the non-minimal path; and determine, in response to a determination that the selected random number is greater than the selected random number, not to force the unit of data to be sent through the non-minimal path.

Example 7 includes the subject matter of any of Examples 1-6, and wherein to obtain the expected performance data comprises to obtain expected buffer status data indicative of an expected fullness of one or more port buffers of the node switch.

Example 8 includes the subject matter of any of Examples 1-7, and wherein to obtain the expected performance data comprises to obtain expected traffic rate data indicative of a number of units of data expected to be transferred through the node switch in a predefined period of time.

Example 9 includes the subject matter of any of Examples 1-8, and wherein to obtain the expected performance data comprises to obtain expected link potential data indicative of an expected number of flits to be transferred in a predefined number of cycles and a number of cycles that an input queue is expected to be empty.

Example 10 includes the subject matter of any of Examples 1-9, and wherein to obtain the measured performance data comprises to obtain measured buffer status data indicative of a measured fullness of one or more port buffers of the node switch.

Example 11 includes the subject matter of any of Examples 1-10, and wherein to obtain the measured performance data comprises to obtain measured traffic rate data indicative of a number of units of data transferred through the node switch in a predefined period of time.

Example 12 includes the subject matter of any of Examples 1-11, and wherein to obtain the measured performance data comprises to obtain measured link potential data indicative of a number of flits that were transferred in a predefined number of cycles and a number of cycles that an input queue was empty.

Example 13 includes the subject matter of any of Examples 1-12, and wherein the compute engine is further to determine whether the measured data transfer performance for each node port of the node switch satisfies an expected data transfer performance for each node port; and set an allowed traffic rate, indicative of a speed at which to send units of data, for the node ports as a function of whether the measured data transfer performance satisfies the expected data transfer performance for each node port.

Example 14 includes the subject matter of any of Examples 1-13, and wherein the compute engine is further to increment, in response to a determination that the measured data transfer performance does not satisfy the expected data transfer performance for a node port, an aggregate counter; decrement, in response to a determination that the measured data transfer performance does satisfy the expected data transfer performance for another node port, the aggregate counter; and set, as a function of the aggregate counter, the allowed traffic rate.

Example 15 includes the subject matter of any of Examples 1-14, and wherein to set the allowed traffic rate comprises to set the allowed traffic rate as a decimal number of credits to be allocated to each node port for each cycle of the node switch.

Example 16 includes the subject matter of any of Examples 1-15, and wherein to set the allowed traffic rate comprises to identify, in a lookup table of aggregate counter values and allowed traffic rates, an allowed traffic rate associated with the value of the aggregate counter; and set the allowed traffic rate to the identified allowed traffic rate.

Example 17 includes the subject matter of any of Examples 1-16, and wherein the compute engine is further to increment, for each cycle of the node switch, an available number of credits for each node port of the node switch as a function of the allowed traffic rate; and consume a credit and transfer a unit of data if the amount of credit for a corresponding node port is at least one.

Example 18 includes a method for improving throughput in a network, the method comprising obtaining, by a node switch, expected performance data indicative of an expected data transfer performance of the node switch; obtaining, by the node switch, measured performance data indicative of a measured data transfer performance of the node switch; comparing, by the node switch, the measured performance data to the expected performance data to determine whether the measured data transfer performance satisfies the expected data transfer performance; determining, by the node switch and as a function of whether the measured data transfer performance satisfies the expected data transfer performance, whether to force a unit of data through a non-minimal path to a destination; and sending, by the node switch and in response to a determination to force the unit of data to be sent through a non-minimal path, the unit of data to an output port of the node switch associated with the non-minimal path.

Example 19 includes the subject matter of Example 18, and further including determining, by the node switch and in response to a determination not to force the unit of data to be sent through a non-minimal path, whether the minimal path satisfies a predefined condition; and sending, by the node switch and in response to a determination that the minimal path does not satisfy the predefined condition, the unit of data to an output port of the node switch associated with the minimal path.

Example 20 includes the subject matter of any of Examples 18 and 19, and further including determining, by the node switch and in response to a determination not to force the unit of data to be sent through a non-minimal path, whether the minimal path satisfies a predefined condition; and sending, by the node switch and in response to a determination that the minimal path does satisfy the predefined condition, the unit of data to the output port associated with non-minimal path.

Example 21 includes the subject matter of any of Examples 18-20, and wherein determining whether the minimal path satisfies a predefined condition comprises determining whether the minimal path is at least twice as congested as the non-minimal path.

Example 22 includes the subject matter of any of Examples 18-21, and wherein determining whether to force the unit of data to be sent through the non-minimal path comprises incrementing, by the node switch and in response to a determination that the measured data transfer performance does not satisfy the expected data transfer performance, a counter; decrementing, by the node switch and in response to a determination that the measured data transfer performance does satisfy the expected data transfer performance, the counter; and setting, by the node switch and as a function of the counter, a likelihood of forcing the unit of data to be sent through the non-minimal path.

Example 23 includes the subject matter of any of Examples 18-22, and further including selecting, by the node switch, a random number between zero and a predefined maximum number; determining, by the node switch and in response to a determination that the selected random number is less than or equal to the counter, to force the unit of data to be sent through the non-minimal path; and determining, by the node switch and in response to a determination that the selected random number is greater than the selected random number, not to force the unit of data to be sent through the non-minimal path.

Example 24 includes the subject matter of any of Examples 18-23, and wherein obtaining the expected performance data comprises obtaining expected buffer status data indicative of an expected fullness of one or more port buffers of the node switch.

Example 25 includes the subject matter of any of Examples 18-24, and wherein obtaining the expected performance data comprises obtaining expected traffic rate data indicative of a number of units of data expected to be transferred through the node switch in a predefined period of time.

Example 26 includes the subject matter of any of Examples 18-25, and wherein obtaining the expected performance data comprises obtaining expected link potential data indicative of an expected number of flits to be transferred in a predefined number of cycles and a number of cycles that an input queue is expected to be empty.

Example 27 includes the subject matter of any of Examples 18-26, and wherein obtaining the measured performance data comprises obtaining measured buffer status data indicative of a measured fullness of one or more port buffers of the node switch.

Example 28 includes the subject matter of any of Examples 18-27, and wherein obtaining the measured performance data comprises obtaining measured traffic rate data indicative of a number of units of data transferred through the node switch in a predefined period of time.

Example 29 includes the subject matter of any of Examples 18-28, and wherein obtaining the measured performance data comprises obtaining measured link potential data indicative of a number of flits that were transferred in a predefined number of cycles and a number of cycles that an input queue was empty.

Example 30 includes the subject matter of any of Examples 18-29, and further including determining, by the node switch, whether the measured data transfer performance for each node port of the node switch satisfies an expected data transfer performance for each node port; and setting, by the node switch, an allowed traffic rate, indicative of a speed at which to send units of data, for the node ports as a function of whether the measured data transfer performance satisfies the expected data transfer performance for each node port.

Example 31 includes the subject matter of any of Examples 18-30, and further including incrementing, by the node switch and in response to a determination that the measured data transfer performance does not satisfy the expected data transfer performance for a node port, an aggregate counter; decrementing, by the node switch and in response to a determination that the measured data transfer performance does satisfy the expected data transfer performance for another node port, the aggregate counter; and setting, by the node switch and as a function of the aggregate counter, the allowed traffic rate.

Example 32 includes the subject matter of any of Examples 18-31, and wherein setting the allowed traffic rate comprises setting the allowed traffic rate as a decimal number of credits to be allocated to each node port for each cycle of the node switch.

Example 33 includes the subject matter of any of Examples 18-32, and wherein setting the allowed traffic rate comprises identifying, in a lookup table of aggregate counter values and allowed traffic rates, an allowed traffic rate associated with the value of the aggregate counter; and setting the allowed traffic rate to the identified allowed traffic rate.

Example 34 includes the subject matter of any of Examples 18-33, and further including incrementing, by the node switch and for each cycle of the node switch, an available number of credits for each node port of the node switch as a function of the allowed traffic rate; and consuming, by the node switch, a credit and transferring a unit of data if the amount of credit for a corresponding input port is at least one.

Example 35 includes one or more machine-readable storage media comprising a plurality of instructions stored thereon that, in response to being executed, cause a node switch to perform the method of any of Examples 18-34.

Example 36 includes a node switch comprising means for performing the method of any of Examples 18-34.

Example 37 includes a node switch for improving throughput in a network, the node switch comprising one or more processors; one or more memory devices having stored therein a plurality of instructions that, when executed by the one or more processors, cause the node switch to perform the method of any of Examples 18-34.

Example 38 includes a node switch for improving throughput in a network, the node switch comprising a plurality of node ports to transfer data to and from nodes; a plurality of output ports to transfer data to and from other devices; and fairness manager circuitry to obtain expected performance data indicative of an expected data transfer performance of the node switch; obtain measured performance data indicative of a measured data transfer performance of the node switch; compare the measured performance data to the expected performance data to determine whether the measured data transfer performance satisfies the expected data transfer performance; determine, as a function of whether the measured data transfer performance satisfies the expected data transfer performance, whether to force a unit of data through a non-minimal path to a destination; and send, in response to a determination to force the unit of data to be sent through a non-minimal path, the unit of data to an output port of the node switch associated with the non-minimal path.

Example 39 includes the subject matter of Example 38, and wherein the fairness manager circuitry is further to determine, in response to a determination not to force the unit of data to be sent through a non-minimal path, whether the minimal path satisfies a predefined condition; and send, in response to a determination that the minimal path does not satisfy the predefined condition, the unit of data to an output port of the node switch associated with the minimal path.

Example 40 includes the subject matter of any of Examples 38 and 39, and wherein the fairness manager circuitry is further to determine, in response to a determination not to force the unit of data to be sent through a non-minimal path, whether the minimal path satisfies a predefined condition; and send, in response to a determination that the minimal path does satisfy the predefined condition, the unit of data to the output port associated with non-minimal path.

Example 41 includes the subject matter of any of Examples 38-40, and wherein to determine whether the minimal path satisfies a predefined condition comprises to determine whether the minimal path is at least twice as congested as the non-minimal path.

Example 42 includes the subject matter of any of Examples 38-41, and wherein to determine whether to force the unit of data to be sent through the non-minimal path comprises to increment, in response to a determination that the measured data transfer performance does not satisfy the expected data transfer performance, a counter; decrement, in response to a determination that the measured data transfer performance does satisfy the expected data transfer performance, the counter; and set, as a function of the counter, a likelihood of forcing the unit of data to be sent through the non-minimal path.

Example 43 includes the subject matter of any of Examples 38-42, and wherein the fairness manager circuitry is further to select a random number between zero and a predefined maximum number; determine, in response to a determination that the selected random number is less than or equal to the counter, to force the unit of data to be sent through the non-minimal path; and determine, in response to a determination that the selected random number is greater than the selected random number, not to force the unit of data to be sent through the non-minimal path.

Example 44 includes the subject matter of any of Examples 38-43, and wherein to obtain the expected performance data comprises to obtain expected buffer status data indicative of an expected fullness of one or more port buffers of the node switch.

Example 45 includes the subject matter of any of Examples 38-44, and wherein to obtain the expected performance data comprises to obtain expected traffic rate data indicative of a number of units of data expected to be transferred through the node switch in a predefined period of time.

Example 46 includes the subject matter of any of Examples 38-45, and wherein to obtain the expected performance data comprises to obtain expected link potential data indicative of an expected number of flits to be transferred in a predefined number of cycles and a number of cycles that an input queue is expected to be empty.

Example 47 includes the subject matter of any of Examples 38-46, and wherein to obtain the measured performance data comprises to obtain measured buffer status data indicative of a measured fullness of one or more port buffers of the node switch.

Example 48 includes the subject matter of any of Examples 38-47, and wherein to obtain the measured performance data comprises to obtain measured traffic rate data indicative of a number of units of data transferred through the node switch in a predefined period of time.

Example 49 includes the subject matter of any of Examples 38-48, and wherein to obtain the measured performance data comprises to obtain measured link potential data indicative of a number of flits that were transferred in a predefined number of cycles and a number of cycles that an input queue was empty.

Example 50 includes the subject matter of any of Examples 38-49, and wherein the fairness manager circuitry is further to determine whether the measured data transfer performance for each node port of the node switch satisfies an expected data transfer performance for each node port; and set an allowed traffic rate, indicative of a speed at which to send units of data, for the node ports as a function of whether the measured data transfer performance satisfies the expected data transfer performance for each node port.

Example 51 includes the subject matter of any of Examples 38-50, and wherein the fairness manager circuitry is further to increment, in response to a determination that the measured data transfer performance does not satisfy the expected data transfer performance for a node port, an aggregate counter; decrement, in response to a determination that the measured data transfer performance does satisfy the expected data transfer performance for another node port, the aggregate counter; and set, as a function of the aggregate counter, the allowed traffic rate.

Example 52 includes the subject matter of any of Examples 38-51, and wherein to set the allowed traffic rate comprises to set the allowed traffic rate as a decimal number of credits to be allocated to each node port for each cycle of the node switch.

Example 53 includes the subject matter of any of Examples 38-52, and wherein to set the allowed traffic rate comprises to identify, in a lookup table of aggregate counter values and allowed traffic rates, an allowed traffic rate associated with the value of the aggregate counter; and set the allowed traffic rate to the identified allowed traffic rate.

Example 54 includes the subject matter of any of Examples 38-53, and wherein the fairness manager circuitry is further to increment, for each cycle of the node switch, an available number of credits for each node port of the node switch as a function of the allowed traffic rate; and consume a credit and transfer a unit of data if the amount of credit for a corresponding node port is at least one.

Example 55 includes a node switch for improving throughput in a network, the node switch comprising circuitry for obtaining expected performance data indicative of an expected data transfer performance of the node switch; circuitry for obtaining measured performance data indicative of a measured data transfer performance of the node switch; circuitry for comparing the measured performance data to the expected performance data to determine whether the measured data transfer performance satisfies the expected data transfer performance; means for determining, as a function of whether the measured data transfer performance satisfies the expected data transfer performance, whether to force a unit of data through a non-minimal path to a destination; and circuitry for sending, in response to a determination to force the unit of data to be sent through a non-minimal path, the unit of data to an output port of the node switch associated with the non-minimal path.

Example 56 includes the subject matter of Example 55, and further including circuitry for determining, in response to a determination not to force the unit of data to be sent through a non-minimal path, whether the minimal path satisfies a predefined condition; and circuitry for sending, in response to a determination that the minimal path does not satisfy the predefined condition, the unit of data to an output port of the node switch associated with the minimal path.

Example 57 includes the subject matter of any of Examples 55 and 56, and further including circuitry for determining, in response to a determination not to force the unit of data to be sent through a non-minimal path, whether the minimal path satisfies a predefined condition; and circuitry for sending, in response to a determination that the minimal path does satisfy the predefined condition, the unit of data to the output port associated with non-minimal path.

Example 58 includes the subject matter of any of Examples 55-57, and wherein the circuitry for determining whether the minimal path satisfies a predefined condition comprises circuitry for determining whether the minimal path is at least twice as congested as the non-minimal path.

Example 59 includes the subject matter of any of Examples 55-58, and wherein the circuitry for determining whether to force the unit of data to be sent through the non-minimal path comprises circuitry for incrementing, in response to a determination that the measured data transfer performance does not satisfy the expected data transfer performance, a counter; circuitry for decrementing, in response to a determination that the measured data transfer performance does satisfy the expected data transfer performance, the counter; and circuitry for setting, as a function of the counter, a likelihood of forcing the unit of data to be sent through the non-minimal path.

Example 60 includes the subject matter of any of Examples 55-59, and further including circuitry for selecting a random number between zero and a predefined maximum number; circuitry for determining, in response to a determination that the selected random number is less than or equal to the counter, to force the unit of data to be sent through the non-minimal path; and circuitry for determining, in response to a determination that the selected random number is greater than the selected random number, not to force the unit of data to be sent through the non-minimal path.

Example 61 includes the subject matter of any of Examples 55-60, and wherein the circuitry for obtaining the expected performance data comprises circuitry for obtaining expected buffer status data indicative of an expected fullness of one or more port buffers of the node switch.

Example 62 includes the subject matter of any of Examples 55-61, and wherein the circuitry for obtaining the expected performance data comprises circuitry for obtaining expected traffic rate data indicative of a number of units of data expected to be transferred through the node switch in a predefined period of time.

Example 63 includes the subject matter of any of Examples 55-62, and wherein the circuitry for obtaining the expected performance data comprises circuitry for obtaining expected link potential data indicative of an expected number of flits to be transferred in a predefined number of cycles and a number of cycles that an input queue is expected to be empty.

Example 64 includes the subject matter of any of Examples 55-63, and wherein the circuitry for obtaining the measured performance data comprises circuitry for obtaining measured buffer status data indicative of a measured fullness of one or more port buffers of the node switch.

Example 65 includes the subject matter of any of Examples 55-64, and wherein the circuitry for obtaining the measured performance data comprises circuitry for obtaining measured traffic rate data indicative of a number of units of data transferred through the node switch in a predefined period of time.

Example 66 includes the subject matter of any of Examples 55-65, and wherein the circuitry for obtaining the measured performance data comprises circuitry for obtaining measured link potential data indicative of a number of flits that were transferred in a predefined number of cycles and a number of cycles that an input queue was empty.

Example 67 includes the subject matter of any of Examples 55-66, and further including circuitry for determining whether the measured data transfer performance for each node port of the node switch satisfies an expected data transfer performance for each node port; and circuitry for setting an allowed traffic rate, indicative of a speed at which to send units of data, for the node ports as a function of whether the measured data transfer performance satisfies the expected data transfer performance for each node port.

Example 68 includes the subject matter of any of Examples 55-67, and further including circuitry for incrementing, in response to a determination that the measured data transfer performance does not satisfy the expected data transfer performance for a node port, an aggregate counter; circuitry for decrementing, in response to a determination that the measured data transfer performance does satisfy the expected data transfer performance for another node port, the aggregate counter; and circuitry for setting, as a function of the aggregate counter, the allowed traffic rate.

Example 69 includes the subject matter of any of Examples 55-68, and wherein the circuitry for setting the allowed traffic rate comprises circuitry for setting the allowed traffic rate as a decimal number of credits to be allocated to each node port for each cycle of the node switch.

Example 70 includes the subject matter of any of Examples 55-69, and wherein the circuitry for setting the allowed traffic rate comprises circuitry for identifying, in a lookup table of aggregate counter values and allowed traffic rates, an allowed traffic rate associated with the value of the aggregate counter; and circuitry for setting the allowed traffic rate to the identified allowed traffic rate.

Example 71 includes the subject matter of any of Examples 55-70, and further including circuitry for incrementing, for each cycle of the node switch, an available number of credits for each node port of the node switch as a function of the allowed traffic rate; and circuitry for consuming a credit and transferring a unit of data if the amount of credit for a corresponding input port is at least one.

The invention claimed is:

1. A method for increasing throughput in a network, the method comprising:
   receiving, by a node switch, expected performance data indicative of an expected data transfer performance of the node switch through a first path to a destination;
   receiving, by the node switch, measured performance data indicative of a measured data transfer performance of the node switch;
   comparing, by the node switch, the measured performance data to the expected performance data to determine whether the measured data transfer performance satisfies the expected data transfer performance;
   determining, by the node switch and based at least in part on whether the measured data transfer performance satisfies the expected data transfer performance, whether to cause a unit of data to be sent through a worse path to the destination, wherein the worse path includes more switch hops to the destination than that of the first path; and
   sending, by the node switch and in response to a determination to cause the unit of data to be sent through a worse path, the unit of data to an output port of the node switch associated with the worse path.

2. The method of claim 1, further comprising:
   determining, by the node switch and in response to a determination not to cause the unit of data to be sent through a worse path, whether a minimal path satisfies a predefined condition; and
   sending, by the node switch and in response to a determination that the minimal path does not satisfy the predefined condition, the unit of data to an output port of the node switch associated with the minimal path.

3. The method of claim 1, further comprising:
    determining, by the node switch and in response to a determination not to cause the unit of data to be sent through a worse path, whether a minimal path satisfies a predefined condition; and
    sending, by the node switch and in response to a determination that the minimal path does satisfy the predefined condition, the unit of data to the output port associated with worse path.

4. The method of claim 3, wherein determining whether the minimal path satisfies a predefined condition comprises determining whether the minimal path is at least N-times as congested as the worse path.

5. The method of claim 1, wherein determining whether to cause the unit of data to be sent through the worse path comprises:
    incrementing, by the node switch and in response to a determination that the measured data transfer performance does not satisfy the expected data transfer performance, a counter;
    decrementing, by the node switch and in response to a determination that the measured data transfer performance does satisfy the expected data transfer performance, the counter; and
    setting, by the node switch and based at least in part on the counter, a likelihood of forcing the unit of data to be sent through the worse path.

6. The method of claim 5, further comprising:
    selecting, by the node switch, a random number between zero and a predefined maximum number;
    determining, by the node switch and in response to a determination that the selected random number is less than or equal to the counter, to cause the unit of data to be sent through the worse path; and
    determining, by the node switch and in response to a determination that the selected random number is greater than the selected random number, not to cause the unit of data to be sent through the worse path.

7. A node switch for increasing throughput in a network, the node switch comprising:
    circuitry for receiving expected performance data indicative of an expected data transfer performance of the node switch;
    circuitry for receiving measured performance data indicative of a measured data transfer performance of the node switch;
    circuitry for comparing the measured performance data to the expected performance data to determine whether the measured data transfer performance satisfies the expected data transfer performance;
    means for determining, based at least in part on whether the measured data transfer performance satisfies the expected data transfer performance, whether to cause a unit of data to be sent through a worse path to a destination; and
    circuitry for sending, in response to a determination to cause the unit of data to be sent through a worse path, the unit of data to an output port of the node switch associated with the worse path.

8. A node switch for increasing throughput in a network, the node switch comprising:
    a compute engine; and
    communication circuitry coupled to the compute engine, wherein the communication circuitry includes:
        a plurality of node ports to transfer data to and from nodes; and
        a plurality of output ports to transfer data to and from other devices, wherein the compute engine is to:
            receive expected performance data indicative of an expected data transfer performance of the node switch;
            receive measured performance data indicative of a measured data transfer performance of the node switch through a first path to a destination;
            compare the measured performance data to the expected performance data to determine whether the measured data transfer performance satisfies the expected data transfer performance;
            determine, based at least in part on whether the measured data transfer performance satisfies the expected data transfer performance, whether to cause a unit of data to be sent through a worse path to the destination, wherein the worse path includes more switch hops to the destination than that of the first path; and
            send, in response to a determination to cause the unit of data to be sent through a worse path, the unit of data to an output port of the node switch associated with the worse path.

9. The node switch of claim 8, wherein the compute engine is further to:
    determine, in response to a determination not to cause the unit of data to be sent through a worse path, whether a minimal path satisfies a predefined condition; and
    send, in response to a determination that the minimal path does not satisfy the predefined condition, the unit of data to an output port of the node switch associated with the minimal path.

10. The node switch of claim 8, wherein the compute engine is further to:
    determine, in response to a determination not to cause the unit of data to be sent through a worse path, whether a minimal path satisfies a predefined condition; and
    send, in response to a determination that the minimal path does satisfy the predefined condition, the unit of data to the output port associated with worse path.

11. The node switch of claim 10, wherein to determine whether the minimal path satisfies a predefined condition comprises to determine whether the minimal path is at least N-times as congested as the worse path.

12. The node switch of claim 8, wherein to determine whether to cause the unit of data to be sent through the worse path comprises to:
    increment, in response to a determination that the measured data transfer performance does not satisfy the expected data transfer performance, a counter;
    decrement, in response to a determination that the measured data transfer performance does satisfy the expected data transfer performance, the counter; and
    set, based, at least in part, on the counter, a likelihood of forcing the unit of data to be sent through the worse path.

13. The node switch of claim 12, wherein the compute engine is further to:
    select a random number between zero and a predefined maximum number;
    determine, in response to a determination that the selected random number is less than or equal to the counter, to cause the unit of data to be sent through the worse path; and determine, in response to a determination that the selected random number is greater than the selected random number, not to cause the unit of data to be sent through the worse path.

14. The node switch of claim 8, wherein to receive the expected performance data comprises to receive expected buffer status data indicative of an expected fullness of one or more port buffers of the node switch.

15. The node switch of claim 8, wherein to receive the expected performance data comprises to receive expected traffic rate data indicative of a number of units of data expected to be transferred through the node switch in a predefined period of time.

16. The node switch of claim 8, wherein to receive the expected performance data comprises to receive expected link potential data indicative of an expected number of flits to be transferred in a predefined number of cycles and a number of cycles that an input queue is expected to be empty.

17. The node switch of claim 8, wherein to receive the measured performance data comprises to receive measured buffer status data indicative of a measured fullness of one or more port buffers of the node switch.

18. The node switch of claim 8, wherein to receive the measured performance data comprises to receive measured traffic rate data indicative of a number of units of data transferred through the node switch in a predefined period of time.

19. The node switch of claim 8, wherein to receive the measured performance data comprises to receive measured link potential data indicative of a number of flits that were transferred in a predefined number of cycles and a number of cycles that an input queue was empty.

20. One or more non-transitory machine-readable storage media comprising a plurality of instructions stored thereon that, in response to being executed, cause a node switch to:
receive expected performance data indicative of an expected data transfer performance of the node switch;
receive measured performance data indicative of a measured data transfer performance of the node switch through a first path to a destination;
compare the measured performance data to the expected performance data to determine whether the measured data transfer performance satisfies the expected data transfer performance;
determine, based at least in part on whether the measured data transfer performance satisfies the expected data transfer performance, whether to cause a unit of data to be sent through a worse path to the destination, wherein the worse path includes more switch hops to the destination than that of the first path; and
send, in response to a determination to cause the unit of data to be sent through a worse path, the unit of data to an output port of the node switch associated with the worse path.

21. The one or more machine-readable storage media of claim 20, wherein the plurality of instructions, when executed, further cause the node switch to:
determine, in response to a determination not to cause the unit of data to be sent through a worse path, whether a minimal path satisfies a predefined condition; and
send, in response to a determination that the minimal path does not satisfy the predefined condition, the unit of data to an output port of the node switch associated with the minimal path.

22. The one or more machine-readable storage media of claim 20, wherein the plurality of instructions, when executed, further cause the node switch to:
determine, in response to a determination not to cause the unit of data to be sent through a worse path, whether a minimal path satisfies a predefined condition; and
send, in response to a determination that the minimal path does satisfy the predefined condition, the unit of data to the output port associated with worse path.

23. The one or more machine-readable storage media of claim 22, wherein to determine whether the minimal path satisfies a predefined condition comprises to determine whether the minimal path is at least N-times as congested as the worse path.

24. The one or more machine-readable storage media of claim 20, wherein to determine whether to cause the unit of data to be sent through the worse path comprises to:
increment, in response to a determination that the measured data transfer performance does not satisfy the expected data transfer performance, a counter;
decrement, in response to a determination that the measured data transfer performance does satisfy the expected data transfer performance, the counter; and
set, based at least in part on the counter, a likelihood of forcing the unit of data to be sent through the worse path.

25. The one or more machine-readable storage media of claim 24, wherein the plurality of instructions, when executed, further cause the node switch to:
select a random number between zero and a predefined maximum number;
determine, in response to a determination that the selected random number is less than or equal to the counter, to cause the unit of data to be sent through the worse path; and
determine, in response to a determination that the selected random number is greater than the selected random number, not to cause the unit of data to be sent through the worse path.

26. The one or more machine-readable storage media of claim 20, wherein to receive the expected performance data comprises to receive expected buffer status data indicative of an expected fullness of one or more port buffers of the node switch.

27. The one or more machine-readable storage media of claim 20, wherein to receive the expected performance data comprises to receive expected traffic rate data indicative of a number of units of data expected to be transferred through the node switch in a predefined period of time.

28. The one or more machine-readable storage media of claim 20, wherein to receive the expected performance data comprises to receive expected link potential data indicative of an expected number of flits to be transferred in a predefined number of cycles and a number of cycles that an input queue is expected to be empty.

* * * * *